US010205988B1

(12) United States Patent
Waterman et al.

(10) Patent No.: US 10,205,988 B1
(45) Date of Patent: Feb. 12, 2019

(54) SYSTEMS AND METHODS FOR AUTOMATICALLY RESUMING APPROPRIATE PAUSED CONTENT WHEN THERE ARE MULTIPLE USERS AT A MEDIA DEVICE

(71) Applicant: Rovi Guides, Inc., San Jose, CA (US)

(72) Inventors: Herbert Alan Waterman, Merced, CA (US); Richard William Matthews, Livermore, CA (US)

(73) Assignee: ROVI GUIDES, INC., San Jose, CA (US)

( * ) Notice: Subject to any disclaimer, the term of this patent is extended or adjusted under 35 U.S.C. 154(b) by 0 days.

(21) Appl. No.: 15/674,281

(22) Filed: Aug. 10, 2017

(51) Int. Cl.
*H04N 21/45* (2011.01)
*H04N 21/432* (2011.01)
*H04N 21/433* (2011.01)
*H04N 21/442* (2011.01)
*H04N 21/454* (2011.01)
*H04N 21/472* (2011.01)
*H04N 21/475* (2011.01)

(52) U.S. Cl.
CPC ....... *H04N 21/4325* (2013.01); *H04N 21/433* (2013.01); *H04N 21/44218* (2013.01); *H04N 21/454* (2013.01); *H04N 21/4524* (2013.01); *H04N 21/4532* (2013.01); *H04N 21/4751* (2013.01); *H04N 21/47217* (2013.01)

(58) Field of Classification Search
CPC ........... H04N 21/4325; H04N 21/4524; H04N 21/454; H04N 21/4532; H04N 21/4751; H04N 21/47217; H04N 21/44218; H04N 21/433
See application file for complete search history.

(56) References Cited

U.S. PATENT DOCUMENTS

| | | | |
|---|---|---|---|
| 6,239,794 B1 | 5/2001 | Yuen et al. | |
| 6,388,714 B1 | 5/2002 | Schein et al. | |
| 6,564,378 B1 | 5/2003 | Satterfield et al. | |
| 6,756,997 B1 | 6/2004 | Ward et al. | |
| 7,165,098 B1 | 1/2007 | Boyer et al. | |
| 7,761,892 B2 | 7/2010 | Ellis et al. | |
| 8,046,801 B2 | 10/2011 | Ellis et al. | |
| 9,014,546 B2 | 4/2015 | Shimy et al. | |
| 2002/0174430 A1 | 11/2002 | Ellis et al. | |
| 2003/0110499 A1 | 6/2003 | Knudson et al. | |

(Continued)

*Primary Examiner* — Benjamin R Bruckart
*Assistant Examiner* — Aklil M Tesfaye
(74) *Attorney, Agent, or Firm* — Haley Guiliano LLP

(57) ABSTRACT

Systems and methods are disclosed herein for presenting, when there are multiple users at a media device, content that is associated with a user, of the multiple users, with the highest priority level, and upon detecting that only one user is left at the media device, automatically resuming content that the one user was previously consuming. For example, media guidance application may track playback positions in content A and B that users A and B are respectively consuming at different locations. Upon user A joining, while user B is still consuming content B, user B at location B, media guidance application may determine that user B has higher priority level than user A and accordingly, continue playing content B. When the media guidance application detects that user B, but not user A, has left location B, the media guidance application may automatically present content A from a point where the user A left off.

14 Claims, 8 Drawing Sheets

(56) References Cited

U.S. PATENT DOCUMENTS

| | | |
|---|---|---|
| 2005/0251827 A1 | 11/2005 | Ellis et al. |
| 2007/0033607 A1* | 2/2007 | Bryan .................... H04H 60/27 725/10 |
| 2009/0146779 A1* | 6/2009 | Kumar ............... G06K 9/00885 340/5.31 |
| 2010/0153885 A1 | 6/2010 | Yates |
| 2014/0181910 A1* | 6/2014 | Fingal ................... H04L 63/105 726/4 |
| 2015/0070516 A1* | 3/2015 | Shoemake ....... H04N 21/42203 348/207.11 |
| 2015/0319400 A1* | 11/2015 | Golyshko .............. G11B 27/28 386/230 |
| 2018/0007148 A1 | 1/2018 | Nielsen et al. |

* cited by examiner

SYSTEMS AND METHODS FOR AUTOMATICALLY RESUMING APPROPRIATE PAUSED CONTENT WHEN THERE ARE MULTIPLE USERS AT A MEDIA DEVICE

BACKGROUND

In currently available media systems, when a given user (e.g., user A) pauses consumption of a given media asset (e.g., media asset A) on a given device (e.g., device A) at a given location (e.g., location A) and joins another user (e.g., user B), consuming another media asset (e.g., media asset B) on another device (e.g., device B) at another location (e.g., location B), user A is constrained to consume either media asset B or another media asset (e.g., media asset C) that is suitable for both users A and B. When user B leaves location B, the system may continue presenting either media asset B or media asset C. If user A wishes to resume consumption of media asset A, user A has to manually instruct device B to resume media asset A from the paused position. Given the plethora devices and their individual interfaces, manually resuming content on different devices can be cumbersome and consequently, negatively impact media consumption experience of a user.

SUMMARY

Therefore, systems and methods are disclosed herein for presenting, when there are multiple users at a given media device, content that is associated with a user, of the multiple users, that has the highest priority level, and upon detecting that only one user is left at the given media device, automatically resuming content that the one user was previously consuming at a different media device. For example, a media guidance application may track, for a first user watching a first content in a first room and a second user watching a second content in a second room, current playback positions in the first and the second content. When the second user leaves the second room and enters the first room, the media guidance application may determine that the first user has higher priority level than the second user and accordingly, continue playing the first content. When the media guidance application detects that the first user has left the first room but the second remains in the first room, the media guidance application may automatically present the second content in the first room from a point where the second user left off.

In some embodiments, the media guidance application may detect a first user consuming a first media asset on a first user equipment device at a first location simultaneously with a second user consuming a second media asset on a second user equipment device at a second location. For example, the media guidance application may detect that user Mary (e.g., first user) is watching "Game of Thrones" (e.g., first media asset) on a television (e.g., first user equipment device) in the living room (e.g., first location). The media guidance application may also detect that that user Teddy (e.g., second user) is simultaneously watching the movie "Frozen" (e.g., second media asset) on a tablet device (e.g., second user equipment device) in the play room (e.g., second location). Location, as used herein, is defined to mean any geographically distinct position. Location can be, but is not limited to, a room, interior of a vehicle, a position outside a building and a media consumption area associated with a given device. A media consumption area may be some pre-defined area around or in front of the given device such that anyone within the pre-defined area can optimally consume content presented on the given device. As an illustrative example, media consumption area for a display device may be defined based on a viewing axis that is perpendicular to the display screen of the display device. As a matter of example, any point that is within a sixty degree angle to the viewing axis and within five feet from the display screen may be included in the media consumption area of the display device. For example, the media consumption area of the display device may account for the viewing angle of the display device. In particular, an LCD panel vertical alignment panel (VA) may have good contrast but a narrow viewing angle whereas an in-plane switching panel (IPS) may have a wider viewing angle. In such circumstances, the media consumption area of the LCD VA device may be smaller or less wide than the consumption area of the IPS device. As another illustrative example, the media consumption area for an audio device may be any point that is within a five feet radius of the audio device. Various systems and methods for determining detection region for a media device is, discussed in, for example, U.S. Pat. No. 9,014,546, filed Sep. 23, 2009, which is hereby incorporated by reference herein in its entirety. In some embodiments, the pre-defined area associated with a device may be the detection region associated with that device.

The media guidance application may detect that the second user has moved from the second location to the first location, while the first user continues consuming the first media asset on the first user equipment device. For example, the media guidance application may detect that Teddy has moved from the play room to the living room while Mary is still watching "Game of Thrones" in the living room. The media guidance application may store, based on detecting that the second user has left the second location, current playback position in the second media asset corresponding to time when the second user left the second location. The current playback position in the second media asset may be any unique identifier of a current progress point within the second media asset. In some embodiments, the current playback position in the second media asset may be a time code associated with a frame of the second media asset. For example, the time code may be in the format (hour:minute:second:frame) where (hour:minute:second) portion indicates an amount of time elapsed from start point of the second media asset and (frame) identifies a frame associated with point in time indicated by the (hour: minute:second) portion. As an illustrative example, at the time when Teddy leaves the play room, the media guidance application may store time code (00:10:00:00) as a current playback position in "Frozen."

In some embodiments, the media guidance application may, in response to detecting that the second user has entered the first location, determine to continue presenting the first media asset from the stored playback position on the first user equipment device based on determining that the first user has a greater priority level than the second user. For example, upon determining that Teddy has entered the living room, the media guidance application may retrieve priority levels associated with users Teddy and Mary. Priority level may be a qualitative or quantitative indicator of a given user's importance. As an illustrative example, qualitative indicator of a user's importance may be fuzzy logic variables (e.g., "very important," "moderately important" and "not important"). As an illustrative example, quantitative indicator of a user's importance may be may be a numerical value (e.g., seven) on a pre-defined scale (e.g., scale ranging from zero to ten where zero corresponds to lowest possible importance and ten corresponds to highest possible importance). In this case, the priority level may be defined on a numerical scale of zero to ten and the media guidance application may retrieve a priority level of seven for Mary and priority level of five for Teddy. Accordingly, the media guidance application may continue presenting "Game of Thrones" on the television in the living room when Teddy joins Mary in the living room.

The media guidance application may detect that the first user has left the first location while the second user remains in the first location. The media guidance application may present the second media asset on the first user equipment device from the stored current playback position in the second media asset. For example, the media guidance application may detect that Mary has left the living room while Teddy remains in the living room. Accordingly, the media guidance application may automatically present, without receiving any user input from Teddy, "Frozen" from playback position (00:10:00:00)—the playback position in "Frozen" at which Teddy had left the play room.

In some embodiments, the media guidance application may detect, using a first sensor device and a second sensor device respectively, a first user consuming a first media asset on a first user equipment device at a first location simultaneously with a second user consuming a second media asset on a second user equipment device at a second location. The first and second sensor devices may be any monitoring device (e.g., image and video capture devices, motion, physiological, and neurological sensors and other suitable monitoring device) that can be used to detect presence of a user. In some embodiments, the media guidance application may also receive, from any of the first and second sensor devices, unique user identifiers that can be used to identify the first user and the second user. Unique user identifier may include, but is not limited to, log-in information such as a string of characters; bio-metric data such as finger print, retina scan, voice recognition, facial recognition, signature gesture recognition or another suitable bio-metric data; device identifier of a device that is uniquely associated with a given user (e.g., user's smart phone or wearable fitness tracker).

In some embodiments, the first and second sensor devices may be cameras. As an illustrative example, the camera in the play room may detect an image of Teddy and the media guidance application may identify the user as Teddy using facial recognition techniques on the captured images. In the event that Teddy leaves the play room, the camera in the play room will provide images that no longer includes Teddy and accordingly, the media guidance application may determine that Teddy has left the play room. In the event that Teddy joins Mary in the living room, the camera in the living room will provide images that include both Teddy and Mary. Accordingly, the media guidance application may determine that Teddy has entered the living room. The media guidance application may track Mary's movement to various locations in a similar manner. In some embodiments, the first and second sensor devices may be similar types of devices. In some embodiments, the first and second sensor devices may be different types of devices.

In some embodiments, the first and second sensor devices may incorporate Bluetooth low energy beacons. In this case, the media guidance application may use a variety of location detection techniques (e.g., triangulation, scene analysis, proximity) to determine a current location of a device (e.g., smart phone, wearable tracker, Radio-frequency identification (RFID) tag) that is uniquely associated with a given user. The given user is assumed to carry the device that is uniquely associated with the given user on the given user's person and thus, the media guidance application may determine a position of the given user by determining a position of the device that is uniquely associated with the given user. In some embodiments, the given user may have an RFID tag implanted in the user and the user's position may be continuously tracked using the implanted tag.

As an illustrative example, the Bluetooth low energy beacon of the first sensor may broadcast a signal over a given radius. A given device in the given radius may receive the signal at some signal strength and relay information about the received signal strength to the first sensor. The first sensor may then provide this information to the media guidance application. The media guidance application may determine, based on the signal strength received by the given device and data regarding impact of distance on signal strength attenuation, a current position of the given device. The media guidance application may then compare current position of the given device with positions included in the first location to determine whether the given device is at the first location. Upon determining that the given user is at the first location, the media guidance application may retrieve (e.g., from the signal relayed by the device to the first sensor) an identifier associated the given device. The media guidance application may access a data structure that stores association between device identifier and user identifiers and retrieve a user identifier associated with the given device. The media guidance application may then identify the user corresponding to the given device based on the retrieved user identifier.

As an illustrative example, Mary's smart phone may receive a signal from the first sensor and responsively, transmit information about the received signal strength to the first sensor. The media guidance application may determine, based on the information received from Mary's smart phone, coordinates of Mary's smart phone. The media guidance application may compare coordinates of Mary's smart phone with coordinates included in the living room. Upon determining that coordinates of Mary's smart phone is included in the living room, the media guidance application may determine that Mary's smart phone is at the living room. The media guidance application may retrieve an identity of user associated with Mary's smart phone (e.g., Mary) and accordingly, the media guidance application may determine that the Mary is in the living room. Similarly, the media guidance application may detect that the Teddy has left the play room upon determining that coordinates of Teddy's smart phone are not included in coordinates included in the play room. Alternatively, the second sensor device may stop receiving a response signal from Teddy's smart phone because Teddy's smart phone is out of range and accordingly, the media guidance application may determine that Teddy has left the play room. In some implementations, the second sensor may stop receiving a response signal because the smart phone was shut down or turned off. In these situations, the second sensor may receive a signal from the smart phone indicating that it is about to shut down or turn off before the smart phone stops sending the signal. In such circumstances, the media guidance application may use other factors to determine if Teddy has left the play room instead of assuming the user left the play room because the second sensor stopped receiving the signal.

The media guidance application may determine, using suitable location detection and user identification techniques, that user Mary is watching "Game of Thrones" on a television in the living room while user Teddy is watching the movie "Frozen" on a tablet device in the play room. The media guidance application may monitor and store current progress point of each user in their respective media assets.

Specifically, the media guidance application may store, based on monitoring playback of a first media asset on a first user equipment device in the first location, a first current playback position within the first media asset. For example, the media guidance application may monitor current progress point in "Game of Thrones" and continuously update value of a current playback position data structure associated with "Game of Thrones" with the current progress point in "Game of Thrones." As an illustrative example, at a given point in time, the current progress point in "Game of Thrones" may be time code (00:15:00:00) and the media guidance application may store the time code (00:15:00:00) in the current playback position data structure associated with "Game of Thrones". The media guidance application may store, based on monitoring playback of a second media asset on a second user equipment in the second location, a second current playback position within the second media asset. For example, at a given point in time, the current progress point in "Frozen" may be time code (00:8:00:00) and the media guidance application may store the time code (00:8:00:00) in the current playback position data structure associated with "Frozen".

The media guidance application may detect, based on first data received from at least one of the first sensor device and the second sensor device, that the second user has moved from the second location to the first location, while the first user is still consuming the first media asset on the first user equipment device. Following from the example where the first and second sensor devices are cameras, the media guidance application may detect that current images captured by the camera in play room no longer includes images of Teddy. The media guidance application may also detect that current images captured by the camera in the living room now include images of both Mary and Teddy. Accordingly, the media guidance application may determine that Teddy has moved out of the play room and joined Mary in the living room. The media guidance application may determine, based on accessing a device status data structure associated with the television in the living room, that "Game of Thrones" is still being presented on the television when Teddy joined Mary in the living room. Accordingly, the media guidance application may determine that Teddy has moved from the play room to the living room, while Mary is still consuming "Game of Thrones" on the television in the living room.

In some embodiments, the media guidance application may determine that a user has moved from one location to another location based on data received from a smart listening devices (e.g., a personal digital assistant such as Alexa or Google Home). For example, the personal digital assistant at a given location may constantly monitor background sound (e.g., sighs, background conversation and other sounds that are not direct commands for the personal digital assistant) and active command issued to the personal digital assistant to determine users at the given location. The media guidance application may analyze any sound detected by the personal digital assistant, using voice biometrics and voice recognition techniques, to determine an identity of a speaker at the given location. For example, when Teddy from the play room to the living room and says something to Mary, the media guidance application may detect that the data provided by the personal digital assistant in the living room includes a new voice signature. The media guidance application may compare the detected new voice signature with saved voice signatures (e.g., voice prints or voice model) to determine a saved voice signature that matches the detected new voice signature. The media guidance application may then retrieve a user identifier associated with the saved voice signature that matched the detected new voice signature to determine an identity of a user. For example, the media guidance application may determine that the user identifier associated with the saved voice signature that matched the detected new voice signature is "Teddy." Accordingly, the media guidance application may determine that Teddy has moved from the play room to the living room, while Mary is still consuming "Game of Thrones" on the television in the living room.

The media guidance application may, in response to detecting that the second user has left the second location, stop playback of the second media asset on the second user equipment. For example, the media guidance application may, upon detecting that images captured by the camera in the play room no longer include images of Teddy, stop playback of "Frozen" on the tablet. As an illustrative example, at the point in time when Teddy leaves the playroom, the current progress point in "Frozen" may be time code (00:10:00:00). Accordingly, the media guidance application may store the time code (00:10:00:00) in the current playback position data structure associated with "Frozen". The media guidance application may, in response to detecting that the second user has moved to the first location while the first user remains present in the first location, retrieve a pre-defined rule for determining whether to present the first media asset or the second media asset on the first user equipment device. For example, the media guidance application may, upon detecting that current images captured by the camera in the living room now include images of both Mary and Teddy, access a "Rules for presenting appropriate content in multi-user scenario" data structure and query for an appropriate rule for determining which content to present.

As an illustrative example, each rule entry in the "Rules for presenting appropriate content in multi-user scenario" data structure may include a condition field and an instruction field. The value of condition field of a given rule entry may indicate a condition that has to be fulfilled for that the given rule to apply. In this case, the media guidance application may query the "Rules for presenting appropriate content in multi-user scenario" data structure for a rule that has a condition field value of "User A and User B were initially consuming different media asset A and media asset B respectively on separate devices. User B has now joined user A." The media guidance application may perform the query using database management languages such as SQL, JAPQL, CODASYL or another suitable language. In some embodiments, the media guidance application may receive a particular rule entry as a result of the query. In some embodiments, the media guidance application may receive a pointer or link to the particular entry as a result of the query. The media guidance application may determine that the pre-defined rule includes a first instruction to present, on a given user equipment device at a given location, a given media asset that is associated with a given user having a greater priority level. As an illustrative example, the value of the instruction field of the retrieved particular rule entry may be a conditional statement such as "If priority of user A is greater than priority of user B, present media asset associated with user A; else present media asset associated with user A."

The media guidance application may retrieve, from a user priority level data structure, a first priority level associated with the first user and a second priority level associated with the second user. For example, the media guidance application may access the user priority level data structure, located either locally or remotely, and query for priority levels associated with users Mary and Teddy. In this case, the priority level may be defined on a numerical scale of zero to ten and the media guidance application may retrieve a priority level of seven for Mary and a priority level of five for Teddy. In some embodiments, the priority levels of different users may be stored in different data structures. For example, in some embodiments, the priority level for the first user may be stored in a first user profile data structure associated with the first user and the priority level for the second user may be stored in a second user profile data structure associated with the second user. The media guidance application may access the appropriate data structured when determining priority level of each user.

The media guidance application may determine, based on comparing the first priority level with the second priority level, that the first priority level is greater than the second priority level. For example, the media guidance application may use a Boolean comparator function and determine that priority level for Mary (e.g., seven) is greater than priority level for Teddy (e.g., five). The media guidance application may, in response to determining that the that the first priority level is greater than then second priority level, determine to continue presenting the first media asset on the first user equipment device. The media guidance application may, because Mary's priority level is greater than Teddy's priority level, continue presenting "Game of Thrones" on the television in the living room when Teddy joins Mary in the living room.

The media guidance application may detect, based on second data received from the first sensor device, that the first user has left the first location while the second user remains in the first location. For example, at some point in time after Teddy has joined Mary in the living, the media guidance application may detect that current images captured by the camera in the living room include images of Teddy only. Accordingly, the media guidance application may determine that Mary has left the living room while Teddy remains in the living room. The media guidance application may, in response to detecting that the first user has left the first location while the second user remains in the first location, present the second media asset on the first user equipment device from the second current playback position within the second media asset. For example, the media guidance application may retrieve the time code (e.g., (00:10:00:00)) stored in the current playback position data structure associated with "Frozen". The media guidance application may automatically present, without receiving any user input from Teddy, "Frozen" from playback position (00:10:00:00)—the playback position in "Frozen" at which Teddy had left the play room.

In some embodiments, the media guidance application may continue presenting the first media asset upon determining that parental control settings (e.g., PG-13 and below) for the second user matches a content rating associated with the first media asset (e.g., G). Examples of content rating include G, PG-13, R, TV-MA, TV-Y7 and other suitable ratings. Specifically, the media guidance application may, when determining to continue presenting the first media asset on the first user equipment device, determine that the pre-defined rule includes a second instruction to present, on the given user equipment device at the given location, a media asset with content rating that matches parental controls settings associated with each user at the given location. As an illustrative example, the particular rule entry in the "Rules for presenting appropriate content in multi-user scenario" data structure may include another field—an "additional instruction" field. The additional instruction may be applied after the first instruction is applied. The value of the "additional instruction" field of the particular rule entry may be a conditional statement such as "If content rating of selected media asset [selected based on the first instruction] matches parental control settings of both user A and B, present selected media asset; else if content rating of the other unselected media asset [not selected based on the first instruction] matches parental control settings of both user A and B, present the other unselected media asset; else present a new media asset that matches parental control settings of both user A and B."

In some embodiments, the media guidance application may retrieve, from a data structure associated with the first media asset, content rating associated with the first media asset. For example, the media guidance application may access a media guidance data structure associated with the version of "Game of Thrones" being presented on the television in the living room and retrieve a content rating of general audience—(G). The media guidance application may retrieve, from a user profile data structure associated with the second user, parental controls settings for the second user. For example, the media guidance application may access Teddy's user profile and query for the parental controls settings. The media guidance application may receive parental controls settings of "PG-13 and under" as a result of the query. The media guidance application may determine, based on comparing content rating associated with the first media asset with the parental controls settings for the second user, that the content rating associated with the first media asset matches the parental controls settings for the second user. For example, the media guidance application may execute a Boolean comparison function that returns a true result upon determining that a given content rating matches a given parental controls settings. The media guidance application may, in response to determining that the content rating associated with the first media asset matches the parental controls settings for the second user, determine to continue presenting the first media asset on the first user equipment. For example, the media guidance application may, because the parental control settings of Teddy (e.g., "PG-13 and under") matches the content rating of "Game of Thrones" (e.g., G), receive a "true" result from the Boolean comparison function and accordingly, continue presenting "Game of Thrones" on the television.

In some embodiments, priority level associated with a given user may vary from location to location. As an illustrative example, the first user (e.g., Mary) may be an adult and the second user (e.g., Teddy) may be a child. Mary may have higher priority than Teddy in the living room because Mary is the primary user of the living room. Similarly, Teddy may have higher priority than Mary in the play room because Teddy is the primary user of the play room. Specifically, the first priority level and the second priority level may be specific to the first location and where a third priority level associated with the first user at the second location and a fourth priority level associated with the second user at the second location may be different from the first priority level and the second priority level respectively. Following from the example above, in the living room, Mary may have a priority level of seven and Teddy may have a priority level of five. In the play room, Mary may have a priority level of three and Teddy may have a priority level of ten. In some embodiments, the media guidance application may access a location-specific user priority level data structure to determine user priority levels for a given location. For example, there may be a data structure that includes user priorities at the living room location and a separate data structure that includes user priorities at the playroom location. In some embodiments, a single data structure may include the user priorities at the different locations. For example, each entry in the single data structure may include a "user identifier" field, a "location" field and a "priority level" field.

In some embodiments, the media guidance application may wait a pre-determined amount of time after the first user leaves the first location before presenting the second media asset on the first user equipment device. If the first user returns to the first location within the pre-determined amount of time, the media guidance application continues presenting the first media asset. Specifically, the media guidance application may, when presenting the second media asset on the first user equipment device, start, in response to detecting that the first user has left the first location, a first timer that measures amount of time elapsed from a time when the first user left the first location. For example, the media guidance application may, upon detecting, in manners discussed previously, that Mary has left the living room, start a timer, initialized at zero, for measuring amount of time for which Mary is away from the living room. The timer may measure time in the (hour:minute:second) format. If the media guidance application detects that the first user has returned to the first location, the timer is stopped. The media guidance application may retrieve, from a threshold parameters data structure, a first threshold amount of time, where the first threshold amount of time defines a minimum amount of time for which the first user has to be away from the first location before presentation of the first media asset can be switched. For example, the media guidance application may access the threshold parameters data structure, stored locally or remotely, and query, using an appropriate database language, for the first threshold amount of time. For example, the media guidance application may retrieve a value of two minutes as the first threshold amount of time.

The media guidance application may determine, based on comparing value of the first timer with the first threshold amount of time, that the value of the first timer exceeds the threshold amount of time. The media guidance application may, in response to determining that the value of the first timer exceeds the first threshold amount of time, present the second media asset on the first user equipment device from the second current playback position within the second media asset. For example, the media guidance application may execute a Boolean comparison function that returns a "true" result upon determining that the value of the first timer exceeds the threshold amount of time. For example, Mary may be away from the living room for longer than two minutes and the media guidance application may receive a "true" result from the Boolean comparison function when the value of the timer reaches two minutes and one second. Accordingly, the media guidance application may, upon receiving the "true" result, present "Frozen" from playback position (00:10:00:00)—the playback position in "Frozen" at which Teddy had left the play room.

In some embodiments, the media guidance application may, upon determining that the first user has left the first location, determine whether the second user has been at the first location at least a pre-determined amount of time. The media guidance application may present the second media asset on the first user equipment device upon determining that the second user has been at the first location at least the pre-determined amount of time. For example, the second user may have moved to the second location for some other task, and not for consuming content. By determining that the second user has been situated at the first location for at least the pre-determined amount of time before presenting the second media asset, the media guidance application reduces the probability of presenting the second media asset to the second user when the second user has moved to the second location for some other task.

Specifically, the media guidance application may, in response to detecting that the second user has moved to the first location while the first user remains present in the first location, start a second timer that measures amount of time elapsed from a time when the second user moved to the first location. For example, the media guidance application may, upon detecting, in manners discussed previously, that Teddy has joined Mary in the living room, start a timer, initialized at zero, for measuring amount of time for which Teddy is in the living room. The media guidance application may retrieve, from a threshold parameters data structure, a second threshold amount of time, where the second threshold amount of time defines a minimum amount of time for which the second user has to present at the first location before presentation of the first media asset can be switched. For example, the media guidance application may access the threshold parameters data structure, stored locally or remotely, and query, using an appropriate database language, for the second threshold amount of time. For example, the media guidance application may retrieve a value of five minutes as the second threshold amount of time.

The media guidance application may, in response to detecting that the first user has left the first location, compare value of the second timer with the second threshold amount of time. The media guidance application may, in response to determining, based on comparing the value of the second timer with the second threshold amount of time, that the value of the second timer exceeds the second threshold amount of time, present the second media asset on the first user equipment device from the second current playback position within the second media asset. For example, the media guidance application may, upon detecting that Mary has left the living room, execute a Boolean comparison function that returns a "true" result upon determining that the value of the second timer exceeds the threshold amount of time. For example, Teddy may have been in the living room for seven minutes when Mary left the living room. Accordingly, the media guidance application may receive a "true" result from the Boolean comparison function and responsively, the media guidance application may present "Frozen" from playback position (00:10:00:00)—the playback position in "Frozen" at which Teddy had left the play room.

In some embodiments, the media guidance application may determine whether the second user was interested in the second media asset prior to resuming the second media asset on the first user equipment device. For example, the second user may have left the second location because the second user was not interested in the second media asset. Specifically, the media guidance application may, when presenting the second media asset on the first user equipment device from the second current playback position within the second media asset, retrieve, from a media consumption history data structure associated with the second user, a level of engagement of the second user in the second media asset. The term "level of engagement," as used herein, is defined to mean a qualitative or quantitative indicator of a user's interest in a piece of content. Level of engagement may take into account head position, direction and amount of movement in the generation of the quantitative indicator of interest. For example, level of engagement may be fuzzy logic variables such as "not engaged," "moderately engaged" and "highly engaged." The level of engagement may be a numerical value (e.g., three) on a pre-defined scale (e.g., scale ranging from zero to ten where zero corresponds to no engagement and ten corresponds to maximum engagement). As a matter of example, the media guidance application may access media consumption history data structure associated with Teddy and query for Teddy's level of engagement in the "Frozen." The media guidance application may determine, based on the results from the query, that level of engagement of Teddy in the movie "Frozen" is seven.

The media guidance application may determine a level of engagement of a user in a content based on monitoring for indicators of engagement in content. Indicators of engagement in content can be but are not limited to a representation of actions performed on the content (e.g., volume changes, playback speed changes, channel switch and other suitable actions), user's activity during presentation of the content (e.g., user's social media activity, user's movements and gestures and other suitable activity) and user's physiological and emotional response (e.g., user's heart rate, facial expressions and other responses). The media guidance application may access a variety of monitoring devices (e.g., image and video capture devices, motion, physiological, and neurological sensors and other suitable monitoring devices) to monitor for the indicators of engagement. Various systems and methods for determining level of engagement of a user in content based on indicators of content is, discussed in, for example, U.S. patent application Ser. No. 15/198,495, filed Jun. 30, 2016, which is hereby incorporated by reference herein in its entirety.

The media guidance application may retrieve, from a threshold parameters data structure, a threshold level of engagement, where the threshold level of engagement is a minimum level of engagement required to be classified as engaged in a media asset. For example, the media guidance application may access the threshold parameters data structure and query, using an appropriate database language, for the threshold level of engagement. As a matter of example, level of engagement may be defined on a scale of one to ten in this case and the media guidance application may retrieve a value of six as the threshold level of engagement. The media guidance application may determine, based on comparing the level of engagement of the second user in the second media asset with the threshold level of engagement, whether the second user is engaged in the second media asset. The media guidance application may, in response to determining that the second user is engaged in the second media asset, present the second media asset on the first user equipment device from the second current playback position within the second media asset. For example, the media guidance application may execute a Boolean comparison function that returns a "true" result upon determining that the level of engagement of the second user in the second media asset exceeds the threshold level of engagement. The media guidance application may, because Teddy's level of engagement in "Frozen" (e.g., seven) exceeds the threshold level of engagement (e.g., six), receive a "true" result form the Boolean comparison function. Accordingly, the media guidance application may, upon receiving the "true" result, present "Frozen" from playback position (00:10:00:00)—the playback position in "Frozen" at which Teddy had left the play room.

In some embodiments, the media guidance application may, upon determining that the second user is not interested in the second media asset, determine whether the second user is interested in the first media asset. The media guidance application may, upon determining that the second user is interested in the first media asset, continue presenting the first media asset even after the first user leaves the first location. The media guidance application may, upon determining that the second user is not interested in either the first media asset or the second media asset, present a third different media asset when the first user leaves the first location. Specifically, the media guidance application may, in response to determining that the second user is not engaged in the second media asset, retrieve, from the media consumption history data structure associated with the second user, a level of engagement of the second user in the first media asset. As a matter of example, the media guidance application may retrieve a value of three corresponding to Teddy's level of engagement in "Frozen." In this case, the media guidance application may receive a "false" value upon executing the Boolean comparison function that returns a "true" result upon determining that the level of engagement of the second user in the second media asset exceeds the threshold level of engagement. Accordingly, the media guidance application may determine that Teddy is not engaged in "Frozen" and responsively, query the media consumption history data structure for Teddy's level of engagement in "Game of Thrones."

The media guidance application may determine, based on comparing the level of engagement of the second user in the first media asset with the threshold level of engagement, whether the second user is engaged in the first media asset. For example, the media guidance application may execute a Boolean comparison function that returns a "true" result upon determining that the level of engagement of the second user in the first media asset exceeds the threshold level of engagement. The media guidance application may, in response to determining that the second user is engaged in the first media asset, continue presentation of the first media asset on the first user equipment device. As a matter of example, the media guidance application may determine, based on the query results, that Teddy's level of engagement in "Game of Thrones" is eight. The media guidance application may, because Teddy's level of engagement in "Game of Thrones" (e.g., eight) exceeds the threshold level of engagement (e.g., six), receive a "true" result from the Boolean comparison function. Accordingly, the media guidance application may, upon receiving the "true" result, continue presenting "Game of Thrones" on the television in the living room.

The media guidance application may, in response to determining that the second user is not engaged in the first media asset, present a third media asset on the first user equipment device. As a matter of example, the media guidance application may determine, based on the query results, that Teddy's level of engagement in "Game of Thrones" is two. The media guidance application may, because Teddy's level of engagement in "Game of Thrones" (e.g., two) is less than the threshold level of engagement (e.g., six), receive a "false" result from the Boolean comparison function. Accordingly, the media guidance application may, upon receiving the "false" result, present the movie "Up" instead on the television in the living room. The media guidance application may access Teddy's media consumption history and query for Teddy's media asset preferences. The media guidance application may select the third movie based on Teddy's media asset preferences.

In some embodiments, the media guidance application may determine, upon detecting that the first user has left the first location, that a current progress point in the first media asset is in between a start point and an end point of a given segment in the first media asset. The media guidance application may wait until the end point of the given segment is reached before presenting the second media asset. By waiting until the end point of the given segment is reached, the media guidance application ensures that the presentation of the first media asset is stopped at some logical point in the first media asset (e.g., end of a scene, end of a sub-plot arc and other suitable logical points). Specifically, the media guidance application may, when presenting the second media asset on the first user equipment device from the second current playback position within the second media asset, retrieve from a data structure associated with the first media asset, start times and end times of segments of the first media asset. For example, the media guidance application may access a media guidance data structure associated with "Game of Thrones" and retrieve metadata for "Game of Thrones." The media guidance application may parse the metadata, using suitable metadata extraction tools, for start and end times of segments in "Game of Thrones." As a matter of example, the media guidance application may determine, based on the metadata, that "Game of Thrones" is made up of twenty segments (e.g., segments one through twenty, where number of a segment indicates the position of the segment in an ordered sequence of segments in "Game of Thrones"). Segment start and end times may time codes associated with a frame of the first media asset. For example, segment one may have a start time code of (00:00:00) and end time code of (00:02:59). For example, segment four may have a start time code of (00:18:00) and end time code of (00:23:59).

The media guidance application may determine, based on comparing the start times and the end times of the segments of the first media asset with the first current playback position, that the current playback position is in between a first start time and a first end time of a first segment of the first media asset. The media guidance application may refrain from presenting the second media asset until the first current playback position coincides with the first end time. As a matter of example, the media guidance application may determine that the time code associated with current playback position in "Game of Thrones" when Mary exits the living room is (00:20:00). The media guidance application may execute a routine that receives the start time of a given segment, end time of the given segment and the first current playback position as input variables and returns a "true" result in the event that the first current playback position is in between the start time and the end time of the given segment. The media guidance application may repeatedly execute the routine until the media guidance application receives a "true" result or until the media guidance application has checked all segments in the first media asset. As an illustrative example, the media guidance application may determine, based on receiving a "true" result from the routine for segment four of "Game of Thrones," that the current playback position (e.g., 00:20:00) is in between a start time (e.g., 00:18:00) and an end time (e.g., 00:23:59) of segment four of "Game of Thrones." Accordingly, the media guidance application may wait until the current playback position in "Game of Thrones" is (00:23:59) before presenting "Frozen."

In some embodiments, when the first user left the first location, the media guidance application may, upon determining that the current progress point in the first media asset is in between a start point and an end point of a segment in the first media asset, determine whether any characteristic of the given segment matches media asset characteristics that the second user is interested in. The media guidance application may wait until the end point of the given segment is reached before presenting the second media asset only if the given segment is associated with a media asset characteristic that the second user is interested in. Specifically, the media guidance application may, when refraining from presenting the second media asset until the first current playback position coincides with the first end time, retrieve, from the data structure associated with the first media asset, a first media asset characteristic associated with the first segment of the first media asset. Following from the example above, where the current playback position in "Game of Thrones" when Mary leaves the living room is in between the start and end times of segment four, the media guidance application may retrieve, from the media guidance data structure associated with "Game of Thrones," metadata associated with segment four. The media guidance application may extract, from the metadata for segment four, a media asset characteristic of segment four of "Game of Thrones." Media asset characteristic may include, but is not limited to, a genre, an actor, a character, a plotline, a setting and an event. As an illustrative example, segment four of "Game of Thrones" may be associated with the story-line of the character "John Snow" who is played by the actor "Kit Harington." The media guidance application may select actor "Kit Harington" as first media asset characteristic.

The media guidance application may retrieve, from a user profile data structure associated with the second user, preferred media asset characteristics of the second user. The media guidance application may determine, based on comparing the first media asset characteristic with the preferred media asset characteristics of the second user, that the first media asset characteristic is included in the preferred media asset characteristics of the second user. For example, the media guidance application may access may access Teddy's user profile and query for Teddy's preferred media asset characteristics. The media guidance application may receive a list of Teddy's preferred media asset characteristics as a result of the query. The media guidance application may then execute a Boolean function that takes a certain media asset characteristic as an input and returns a "true" result if the list of Teddy's preferred media asset characteristics includes the certain media asset characteristic. As a matter of example, the media guidance application may execute the Boolean function to determine whether the list of Teddy's preferred media asset characteristics includes "Kit Harrington." In some embodiments, the media guidance application may repeatedly execute the Boolean function until it receives a "true" result or until the media guidance application has checked all media asset characteristics associated with the first segment. The media guidance application may, in response to determining that the first media asset characteristic is included in the preferred media asset characteristics of the second user, refrain from presenting the second media asset until the first current playback position coincides with the first end time. In this case, the media guidance application may receive, because the list of Teddy's preferred media asset characteristics includes "Kit Harrington," a "true" result from the Boolean function. Accordingly, the media guidance application may determine that segment four of "Game of Thrones" is associated with a media asset characteristic Teddy prefers and therefore, the media guidance application may wait until the current playback position in "Game of Thrones" reaches (00:23:59) before presenting "Frozen."

It should be noted that the systems, methods, apparatuses, and/or aspects described above may be applied to, or used in accordance with, other systems, methods, apparatuses, and/or aspects described in this disclosure. It should also be noted, the systems and/or methods described above may be applied to, or used in accordance with, other systems and/or methods.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The described systems and methods present, when there are multiple users at a given media device, content that is associated with a user, of the multiple users, that has the highest priority level, and upon detecting that only one user is left at the given media device, automatically resumes content that the one user was previously consuming at a different media device. For example, a media guidance application may track, for a first user watching a first content in a first room and a second user watching a second content in a second room, current playback positions in the first and the second content. When the second user leaves the second room and enters the first room, the media guidance application may determine that the first user has higher priority level than the second user and accordingly, continue playing the first content. When the media guidance application detects that the first user has left the first room but the second remains in the first room, the media guidance application may automatically present the second content in the first room from a point where the second user left off.

Figure 1:
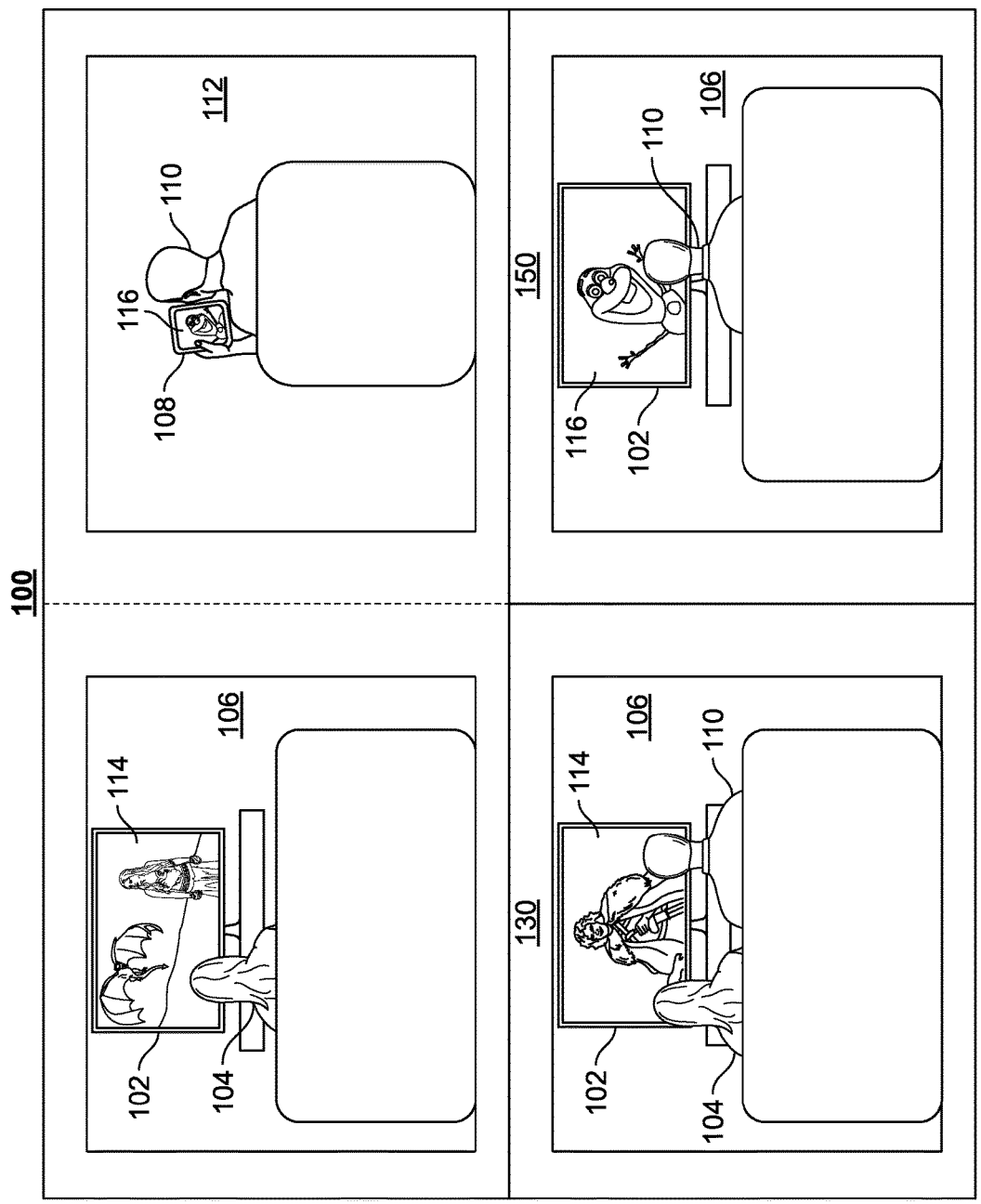
FIG. 1 depicts a user equipment device on which appropriate paused content may be resumed, when there are multiple users at the user equipment device, in accordance with some embodiments of the disclosure.

FIG. 1 depicts an user equipment device on which appropriate paused content may be resumed, when there are multiple users at the user equipment device, in accordance with some embodiments of the disclosure. FIG. 1 depicts, at time 100, user 104 (e.g., first user) consuming media asset 114 on a user equipment device 102 (e.g., first user equipment device) at location 106 (e.g., first location such as a living room). FIG. 1 also depicts, at time 100, user 110 (e.g., second user) consuming a media asset 116 on a user equipment device 108 (e.g., second user equipment device) at location 112 (e.g., second location such as a play room). FIG. 1 depicts that at time 130, later than time 100, user 110 has exited location 112 and joined user 104 at location 106, while user 104 is still consuming media asset 114 on a user equipment device 102. FIG. 1 depicts that at time 150, later than time 130, user 104 has exited location 106 while user 104 remains at location 106. At time 150, the media guidance application may automatically resume presentation of media asset 116 from a playback position in media asset 116 when user 110 exited location 112.

In some embodiments, the media guidance application may detect a first user consuming a first media asset on a first user equipment device at a first location simultaneously with a second user consuming a second media asset on a second user equipment device at a second location. For example, the media guidance application may detect that user 104 (e.g., first user Mary) is watching media asset 114 (e.g., first media asset such as "Game of Thrones") on a user equipment device 102 (e.g., first user equipment device such as a television) at location 106 (e.g., first location such as a living room). The media guidance application may also detect that that user 110 (e.g., second user Teddy) is simultaneously watching media asset 116 (e.g., second media asset such as "Frozen") on user equipment device 108 (e.g., second user equipment device such as a tablet device) at location 112 (e.g., second location such as play room). In some embodiments, user 110 may include more than one person (e.g., Teddy and Freddy) and the media guidance application may treat the combination of Teddy and Freddy as a single user profile. In such circumstances, when one of the multiple users that are part of the combined profile is not detected at the location, the media guidance application may determine that user 110 is not at the location. In particular, if two users were watching media asset 116 together and one of the two users leaves the location, the media guidance application may store an indication of the progress point in the media asset at the time the user left the location. In some implementations, the media guidance application may automatically pause playback of the media asset when one of the multiple users that are part of the combined profile leaves the location.

Location, as used herein, is defined to mean any geographically distinct position. Location can be, but it not limited to, a room, interior of a vehicle, a position outside a building and a media consumption area associated with a given device. A media consumption area may be some pre-defined area around or in front of the given device such that anyone within the pre-defined area can optimally consume content presented on the given device. As an illustrative example, media consumption area for a display device may be defined based on a viewing axis that is perpendicular to the display screen of the display device. As a matter of example, any point that is within a sixty degree angle to the viewing axis and within five feet from the display screen may be included in the media consumption area of the display device. As another illustrative example, the media consumption area for an audio device may be any point that is within a five feet radius of the audio device.

The media guidance application may detect that the second user has moved from the second location to the first location, while the first user continues consuming the first media asset on the first user equipment device. For example, the media guidance application may detect that user 110 (e.g., Teddy) has moved from location 112 (e.g., play room) to location 106 (e.g., the living room) while user 104 (e.g., Mary) is still watching media asset 114 (e.g., "Game of Thrones") at location 106. For example, in the case of a combined profile, the media guidance application may detect that all the users that are part of user 110 (e.g., Teddy and Freddy) have moved, together or at different times, from location 112 (e.g., play room) to location 106 (e.g., the living room) while user 104 (e.g., Mary) is still watching media asset 114 (e.g., "Game of Thrones") at location 106. The media guidance application may store, based on detecting that the second user has left the second location (e.g., when any one of the users that are part of the combined profile leaves the second location), current playback position in the second media asset corresponding to time when the second user left the second location. The current playback position in the second media asset may be any unique identifier of a current progress point within the second media asset. In some embodiments, the current playback position in the second media asset may be a time code associated with a frame of the second media asset. For example, the time code may be in the format (hour:minute:second:frame) where (hour: minute:second) portion indicates an amount of time elapsed from start point of the second media asset and (frame) identifies a frame associated with point in time indicated by the (hour:minute:second) portion. As an illustrative example, at the time when user 110 leaves the location 112, the media guidance application may store time code (00:10:00:00) as a current playback position in media asset 116.

In some embodiments, the media guidance application may, in response to detecting that the second user (e.g., including all of the users that are part of the combined profile of the second user) has entered the first location, determine to continue presenting the first media asset from the stored playback position on the first user equipment device based on determining that the first user has a greater priority level than the second user. For example, upon determining that user 110 (e.g., Teddy) has entered the living room, the media guidance application may retrieve priority levels associated with user 110 and user 104 (e.g., Mary). For example, upon determining that all of the users that are part of user 110 (e.g., Teddy and Freddy) have joined together, at the same time or arriving at different times, and are all at the living room, the media guidance application may retrieve priority levels associated with user 110 and user 104 (e.g., Mary). Priority level may be a qualitative or quantitative indicator of a given user's importance. As an illustrative example, qualitative indicator of a user's importance may be fuzzy logic variables (e.g., "very important," "moderately important" and "not important"). As an illustrative example, quantitative indicator of a user's importance may be may be a numerical value (e.g., seven) on a pre-defined scale (e.g., scale ranging from zero to ten where zero corresponds to lowest possible importance and ten corresponds to highest possible importance). In this case, the priority level may be defined on a numerical scale of zero to ten and the media guidance application may retrieve a priority level of seven for user 104 (e.g., Mary) and priority level of five for user 110 (e.g., Teddy). Accordingly, the media guidance application may continue presenting media asset 114 (e.g., "Game of Thrones") on the user equipment device 102 (e.g., television) at location 106 (e.g., living room) when user 110 joins user 104 at location 106.

The media guidance application may detect that the first user has left the first location while the second user remains in the first location. The media guidance application may present the second media asset on the first user equipment device from the stored current playback position in the second media asset. For example, the media guidance application may detect that user 104 (e.g., Mary) has left location 106 (e.g., the living room) while user 110 (e.g., Teddy) remains at location 106. Accordingly, the media guidance application may automatically present, without receiving any user input from user 110, media asset 116 (e.g., "Frozen") from playback position (00:10:00:00)—the playback position in media asset 116 at which user 110 had left location 112 (e.g., play room). For example, the media guidance application may detect that user 104 (e.g., Mary) has left location 106 (e.g., the living room) while all of the users that are part of user 110 (e.g., Teddy and Freddy) remain at location 106. Accordingly, the media guidance application may automatically present, without receiving any user input from any users that are part of user 110, media asset 116 (e.g., "Frozen") from playback position (00:10:00:00)—the playback position in media asset 116 at which user 110 had left location 112 (e.g., play room). In some situations, if only one of the users of user 110 are at location 106 (e.g., if only Freddy but not Teddy are in the living room), the media guidance application may not automatically present media asset 116 and instead may continue presenting the content being presented before the first user left the location. Alternatively, the media guidance application may automatically present content matching Freddy's profile that was previously paused which was not being watched by Freddy together with Teddy.

In some embodiments, media asset 114 and media asset 116 may be the same media asset. For example, media asset 114 and media asset 116 may both be "Game of Thrones." However, progress point of user 104 in media asset 114 may be different from progress point of user 110 in media asset 116. For example, the media guidance application may determine, when user 110 joins user 104 at location 106, that current playback position of user 104 in "Game of Thrones" is (00:10:00:00) and current playback position of user 110 in "Game of Thrones" is (00:15:00:00). In this case, the media guidance application may use the user priority level to determine which playback position to present "Game of Thrones" from. For example, the media guidance application may retrieve a priority level of seven for user 104 and priority level of five for user 110. Accordingly, the media guidance application may continue presenting "Game of Thrones" from playback position (00:10:00:00) on the user equipment device 102 at location 106 (e.g., living room) when user 110 joins user 104 at location 106.

In some embodiments, the media guidance application may detect, using a first sensor device and a second sensor device respectively, a first user consuming a first media asset on a first user equipment device at a first location simultaneously with a second user consuming a second media asset on a second user equipment device at a second location. The first and second sensor devices may be any monitoring device (e.g., image and video capture devices, motion, physiological, and neurological sensors and other suitable monitoring device) that can be used to detect presence of a user or multiple users (e.g., in the case of a combined profile). In some embodiments, the media guidance application may also receive, from any of the first and second sensor devices, unique user identifiers that can be used to identify the first user and the second user. Unique user identifier may include, but is not limited to, log-in information such as a string of characters; bio-metric data such as finger print, retina scan, voice recognition, facial recognition, signature gesture recognition or another suitable bio-metric data; device identifier of a device that is uniquely associated with a given user (e.g., user's smart phone or wearable fitness tracker).

In some embodiments, the first and second sensor devices may be cameras. As an illustrative example, the camera at location 112 (e.g., the play room) may detect an image of user 110 (e.g., Teddy) and the media guidance application may identify the user as user 110 using facial recognition techniques on the captured images. In the event that any user corresponding to user 110 leaves location 112, the camera at location 112 will provide images that no longer includes user of user 110 who left and accordingly, the media guidance application may determine that user 110 has left location 112. In the event that user 110 joins user 104 (e.g., Mary) at location 106 (e.g., the living room), the camera at location 106 will provide images that include both user 104 and any user corresponding to user 110. Accordingly, the media guidance application may determine that user 110 has entered location 106. The media guidance application may track user 104's movement to various locations in a similar manner. In some embodiments, the first and second sensor devices may be similar types of devices. In some embodiments, the first and second sensor devices may be different types of devices.

In some embodiments, the first and second sensor devices may incorporate Bluetooth low energy beacons. In this case, the media guidance application may use a variety of location detection techniques (e.g., triangulation, scene analysis, proximity) to determine a current location of a device (e.g., smart phone, wearable tracker, Radio-frequency identification (RFID) tag) that is uniquely associated with a given user. The given user is assumed to carry the device that is uniquely associated with the given user on the given user's person and thus, the media guidance application may determine a position of the given user by determining a position of the device that is uniquely associated with the given user.

As an illustrative example, the Bluetooth low energy beacon of the first sensor may broadcast a signal over a given radius. A given device in the given radius may receive the signal at some signal strength and relay information about the received signal strength to the first sensor. The first sensor may then provide this information to the media guidance application. The media guidance application may determine, based on the signal strength received by the given device and data regarding impact of distance on signal strength attenuation, a current position of the given device. The media guidance application may then compare current position of the given device with positions included in the first location to determine whether the given device is at the first location. Upon determining that the given user is at the first location, the media guidance application may retrieve (e.g., from the signal relayed by the device to the first sensor) an identifier associated the given device. The media guidance application may access a data structure, located at any of storage 408, media content source 516 and media guidance data source 518, that stores association between device identifier and user identifiers and retrieve a user identifier associated with the given device. The media guidance application may then identify the user corresponding to the given device based on the retrieved user identifier.

As an illustrative example, user 104's (e.g., Mary) smart phone may receive a signal from the first sensor and responsively, transmit information about the received signal strength to the first sensor. The media guidance application may determine, based on the information received from user 104's smart phone, coordinates of user 104's smart phone. The media guidance application may compare coordinates of user 104's smart phone with coordinates included in location 106 (e.g., the living room). Upon determining that coordinates of user 104's smart phone is included in the living room, the media guidance application may determine that user 104's smart phone is at location 106. The media guidance application may retrieve an identity of user associated with user 104's smart phone (e.g., user 104) and accordingly, the media guidance application may determine that the user 104 is at location 106. Similarly, the media guidance application may detect that the user 110 (e.g., Teddy) has left location 112 (e.g., the play room) upon determining that coordinates of user 110's smart phone are not included in coordinates included in location 112. Alternatively, the second sensor device may stop receiving a response signal from user 110's smart phone because user 110's smart phone is out of range and accordingly, the media guidance application may determine that user 110 has left location 112.

The media guidance application may determine, using suitable location detection and user identification techniques, that, at time 100, user 104 (e.g., Mary) is watching media asset 114 (e.g., "Game of Thrones") on user equipment device 102 (e.g., a television) at location 106 (e.g., the living room) while user 110 (e.g., Teddy) is watching media asset 116 (e.g., "Frozen") on user equipment device 108 (e.g., a tablet device) at location 112 (e.g., the play room). The media guidance application may monitor and store current progress point of each user in their respective media assets. Specifically, the media guidance application may store, based on monitoring playback of a first media asset on a first user equipment device in the first location, a first current playback position within the first media asset. For example, the media guidance application may monitor current progress point in media asset 114 and continuously update value of a current playback position data structure associated with media asset 114 with the current progress point in media asset 114. As an illustrative example, at a given point in time, the current progress point in media asset 114 may be time code (00:15:00:00) and the media guidance application may store the time code (00:15:00:00) in the current playback position data structure associated with media asset 114. The media guidance application may store, based on monitoring playback of a second media asset on a second user equipment in the second location, a second current playback position within the second media asset. For example, at a given point in time, the current progress point in media asset 116 (e.g., "Frozen") may be time code (00:8:00:00) and the media guidance application may store the time code (00:8:00:00) in the current playback position data structure associated with media asset 116.

The media guidance application may detect, based on first data received from at least one of the first sensor device and the second sensor device, that the second user has moved from the second location to the first location, while the first user is still consuming the first media asset on the first user equipment device. Following from the example where the first and second sensor devices are cameras, the media guidance application may detect that current images captured by the camera at location 112 (e.g., play room) no longer includes images of user 110 (e.g., Teddy). The media guidance application may also detect that current images captured by the camera at location 106 (e.g., the living room) now include images of both user 104 and user 110. Accordingly, the media guidance application may determine that user 110 has moved out of location 112 and joined user 104 at location 106 (e.g., living room). The media guidance application may determine, based on accessing a device status data structure associated with the user equipment device 102 at location 106, that media asset 114 (e.g., "Game of Thrones") was still being presented on user equipment device 102 (e.g., television) when user 110 joined user 104 at location 106. Accordingly, the media guidance application may determine that user 110 has moved from location 112 to location 106, while user 104 is still consuming media asset 114 on user equipment device 102 at location 106.

The media guidance application may, in response to detecting that the second user has left the second location, stop playback of the second media asset on the second user equipment. For example, the media guidance application may, upon detecting that images captured by the camera in the play room no longer include images of user 110 (e.g., Teddy), stop playback of media asset 116 (e.g., "Frozen") on user equipment device 108 (e.g., the tablet). As an illustrative example, at the point in time when user 110 leaves location 112, the current progress point in media asset 116 may be time code (00:10:00:00). Accordingly, the media guidance application may store the time code (00:10:00:00) in the current playback position data structure associated with media asset 116. The media guidance application may, in response to detecting that the second user has moved to the first location while the first user remains present in the first location, retrieve a pre-defined rule for determining whether to present the first media asset or the second media asset on the first user equipment device. For example, the media guidance application may, upon detecting that current images captured by the camera at location 106 (e.g., living room) now include images of both user 104 and user 110, access a "Rules for presenting appropriate content in multi-user scenario" data structure, located at any of storage 408, media content source 516 and media guidance data source 518, and query for an appropriate rule for determining which content to present.

As an illustrative example, each rule entry in the "Rules for presenting appropriate content in multi-user scenario" data structure may include a condition field and an instruction field. The value of condition field of a given rule entry may indicate a condition that has to be fulfilled for that the given rule to apply. In this case, the media guidance application may query the "Rules for presenting appropriate content in multi-user scenario" data structure for a rule that has a condition field value of "User A and User B were initially consuming different media asset A and media asset B respectively on separate devices. User B has now joined user A." The media guidance application may perform the query using database management languages such as SQL, JAPQL, CODASYL or another suitable language. In some embodiments, the media guidance application may receive a particular rule entry as a result of the query. In some embodiments, the media guidance application may receive a pointer or link to the particular entry as a result of the query. The media guidance application may determine that the pre-defined rule includes a first instruction to present, on a given user equipment device at a given location, a given media asset that is associated with a given user having a greater priority level. As an illustrative example, the media guidance application may determine that value of the instruction field of the retrieved particular rule entry is a conditional statement such as "If priority of user A is greater than priority of user B, present media asset associated with user A; else present media asset associated with user A."

The media guidance application may retrieve, from a user priority level data structure, a first priority level associated with the first user and a second priority level associated with the second user. For example, the media guidance application may access the user priority level data structure, located at any of storage 408, media content source 516 and media guidance data source 518, and query for priority levels associated with user 104 and user 110. In this case, the priority level may be defined on a numerical scale of zero to ten and the media guidance application may retrieve a priority level of seven for user 104 and a priority level of five for user 110. In some embodiments, the priority levels of different users may be stored in different data structures. For example, in some embodiments, the priority level for the first user may be stored in a first user profile data structure associated with the first user and the priority level for the second user may be stored in a second user profile data structure associated with the second user. The media guidance application may access the appropriate data structured when determining priority level of each user.

The media guidance application may determine, based on comparing the first priority level with the second priority level, that the first priority level is greater than the second priority level. For example, the media guidance application may use a Boolean comparator function and determine that priority level for user 104 (e.g., seven) is greater than priority level for user 110 (e.g., five). The media guidance application may, in response to determining that the that the first priority level is greater than then second priority level, determine to continue presenting the first media asset on the first user equipment device. The media guidance application may, because user 104's priority level is greater than user 110's priority level, continue presenting media asset 114 (e.g., "Game of Thrones") on user equipment device 102 (e.g., television) at location 106 (e.g., living room) when user 110 joins user 104 at location 106.

The media guidance application may detect, based on second data received from the first sensor device, that the first user has left the first location while the second user remains in the first location. For example, at time 150, the media guidance application may detect that current images captured by the camera at location 106 (e.g., living room) include images of user 110 only. Accordingly, the media guidance application may determine that user 104 has left location 106 while user 110 remains at location 106. The media guidance application may, in response to detecting that the first user has left the first location while the second user remains in the first location, present the second media asset on the first user equipment device from the second current playback position within the second media asset. For example, the media guidance application may retrieve the time code (e.g., (00:10:00:00)) stored in the current playback position data structure associated with media asset 116 (e.g., "Frozen"). The media guidance application may automatically present, without receiving any user input from user 110, media asset 116 from playback position (00:10:00:00)—the playback position in media asset 116 at which user 110 had left location 112.

In some embodiments, the media guidance application may continue presenting the first media asset upon determining that parental control settings (e.g., PG-13 and below) for the second user matches a content rating associated with the first media asset (e.g., G). Examples of content rating include G, PG-13, R, TV-MA, TV-Y7 and other suitable ratings. Specifically, the media guidance application may, when determining to continue presenting the first media asset on the first user equipment device, determine that the pre-defined rule includes a second instruction to present, on the given user equipment device at the given location, a media asset with content rating that matches parental controls settings associated with each user at the given location. As an illustrative example, the particular rule entry in the "Rules for presenting appropriate content in multi-user scenario" data structure may include another field—an "additional instruction" field. The additional instruction may be applied after the first instruction is applied. The value of the "additional instruction" field of the particular rule entry may be a conditional statement such as "If content rating of selected media asset [selected based on the first instruction] matches parental control settings of both user A and B, present selected media asset; else if content rating of the other unselected media asset [not selected based on the first instruction] matches parental control settings of both user A and B, present the other unselected media asset; else present a new media asset that matches parental control settings of both user A and B."

In some embodiments, the media guidance application may retrieve, from a data structure associated with the first media asset, content rating associated with the first media asset. For example, the media guidance application may access a media guidance data structure associated with media asset 114 (e.g., "Game of Thrones") being presented on user equipment device 102 (e.g., television) at location 106 (e.g., living room) and retrieve a content rating of general audience—(G). The media guidance application may retrieve, from a user profile data structure associated with the second user, parental controls settings for the second user. For example, the media guidance application may access user 110's user profile, located at any of storage 408, media content source 516 and media guidance data source 518, and query for the parental controls settings. The media guidance application may receive parental controls settings of "PG-13 and under" as a result of the query. The media guidance application may determine, based on comparing content rating associated with the first media asset with the parental controls settings for the second user, that the content rating associated with the first media asset matches the parental controls settings for the second user. For example, the media guidance application may execute a Boolean comparison function that returns a true result upon determining that a given content rating matches a given parental controls settings. The media guidance application may, in response to determining that the content rating associated with the first media asset matches the parental controls settings for the second user, determine to continue presenting the first media asset on the first user equipment. For example, the media guidance application may, because the parental control settings of user 110 (e.g., "PG-13 and under") matches the content rating of media asset 114 (e.g., General—G)), receive a "true" result from the Boolean comparison function and accordingly, continue presenting media asset 114 on user equipment device 102.

In some embodiments, priority level associated with a given user may vary from location to location. As an illustrative example, the user 104 (e.g., Mary) may be an adult and user 110 (e.g., Teddy) may be a child. User 104 may have higher priority than user 110 at location 106 (e.g., living room) because user 110 is the primary user of the location 106. Similarly, user 110 may have higher priority than user 104 at location 112 (e.g., play room) because user 110 is the primary user of location 112. Specifically, the first priority level and the second priority level may be specific to the first location and where a third priority level associated with the first user at the second location and a fourth priority level associated with the second user at the second location may be different from the first priority level and the second priority level respectively. Following from the example above, at location 106, user 104 may have a priority level of seven and user 110 may have a priority level of five. At location 112, user 104 may have a priority level of three and user 110 may have a priority level of ten. In some embodiments, the media guidance application may access a location-specific user priority level data structure to determine user priority levels for a given location. For example, there may be a data structure that includes user priorities at location 106 and a separate data structure that includes user priorities at location 112. In some embodiments, a single data structure may include the user priorities at the different locations. For example, each entry in the single data structure may include a "user identifier" field, a "location" field and a "priority level" field.

In some embodiments, the media guidance application may wait a pre-determined amount of time after the first user leaves the first location before presenting the second media asset on the first user equipment device. If the first user returns to the first location within the pre-determined amount of time, the media guidance application continues presenting the first media asset. Specifically, the media guidance application may, when presenting the second media asset on the first user equipment device, start, in response to detecting that the first user has left the first location, a first timer that measures amount of time elapsed from a time when the first user left the first location. For example, the media guidance application may, upon detecting, in manners discussed previously, that user 104 (e.g., Mary) has left location 106 (e.g., living room), start a timer, initialized at zero, for measuring amount of time for which user 104 is away from location 106. The timer may measure time in the (hour:minute:second) format. If the media guidance application detects that user 104 has returned to location 106, the timer is stopped and reinitialized. The media guidance application may retrieve, from a threshold parameters data structure, located at any of storage 408, media content source 516 and media guidance data source 518, a first threshold amount of time, where the first threshold amount of time defines a minimum amount of time for which the first user has to be away from the first location before presentation of the first media asset can be switched. For example, the media guidance application may access the threshold parameters data structure and query, using an appropriate database language, for the first threshold amount of time. For example, the media guidance application may retrieve a value of two minutes as the first threshold amount of time.

The media guidance application may determine, based on comparing value of the first timer with the first threshold amount of time, that the value of the first timer exceeds the threshold amount of time. The media guidance application may, in response to determining that the value of the first timer exceeds the first threshold amount of time, present the second media asset on the first user equipment device from the second current playback position within the second media asset. For example, the media guidance application may execute a Boolean comparison function that returns a "true" result upon determining that the value of the first timer exceeds the threshold amount of time. For example, user 104 (e.g., Mary) may be away from location 106 (e.g., living room) for longer than two minutes and the media guidance application may receive a "true" result from the Boolean comparison function when the value of the timer reaches two minutes and one second. Accordingly, the media guidance application may, upon receiving the "true" result, present media asset 116 (e.g., "Frozen") from playback position (00:10:00:00)—the playback position in media asset 116 at which user 110 had left location 112.

In some embodiments, the media guidance application may, upon determining that the first user has left the first location, determine whether the second user has been at the first location at least a pre-determined amount of time. The media guidance application may present the second media asset on the first user equipment device upon determining that the second user has been at the first location at least the pre-determined amount of time. For example, the second user may have moved to the second location for some other task, and not for consuming content. By determining that the second user has been situated at the first location for at least the pre-determined amount of time before presenting the second media asset, the media guidance application reduces the probability of presenting the second media asset to the second user when the second user has moved to the second location for some other task.

Specifically, the media guidance application may, in response to detecting that the second user has moved to the first location while the first user remains present in the first location, start a second timer that measures amount of time elapsed from a time when the second user moved to the first location. For example, the media guidance application may, upon detecting, in manners discussed previously, that user 110 (e.g., Teddy) has joined user 104 (e.g., Mary) at location 106 (e.g., living room), start a timer, initialized at zero, for measuring amount of time for which user 110 is at location 106. The media guidance application may retrieve, from a threshold parameters data structure, a second threshold amount of time, where the second threshold amount of time defines a minimum amount of time for which the second user has to present at the first location before presentation of the first media asset can be switched. For example, the media guidance application may access the threshold parameters data structure, located at any of storage 408, media content source 516 and media guidance data source 518, and query, using an appropriate database language, for the second threshold amount of time. For example, the media guidance application may retrieve a value of five minutes as the second threshold amount of time.

The media guidance application may, in response to detecting that the first user has left the first location, compare value of the second timer with the second threshold amount of time. The media guidance application may, in response to determining, based on comparing the value of the second timer with the second threshold amount of time, that the value of the second timer exceeds the second threshold amount of time, present the second media asset on the first user equipment device from the second current playback position within the second media asset. For example, the media guidance application may, upon detecting that user 104 (e.g., Mary) has left the living room, execute a Boolean comparison function that returns a "true" result upon determining that the value of the second timer exceeds the threshold amount of time. For example, user 110 (e.g., Teddy) may have been at location 106 (e.g., living room) for seven minutes when user 104 left location 106. Accordingly, the media guidance application may receive a "true" result from the Boolean comparison function and responsively, the media guidance application may present media asset 116 (e.g., "Frozen") from playback position (00:10:00:00)—the playback position in media asset 116 at which user 110 had left location 112.

In some embodiments, the media guidance application may determine whether the second user was interested in the second media asset prior to resuming the second media asset on the first user equipment device. For example, the second user may have left the second location because the second user was not interested in the second media asset. Specifically, the media guidance application may, when presenting the second media asset on the first user equipment device from the second current playback position within the second media asset, retrieve, from a media consumption history data structure associated with the second user, a level of engagement of the second user in the second media asset. The term "level of engagement," as used herein, is defined to mean a qualitative or quantitative indicator of a user's interest in a piece of content. For example, level of engagement may be fuzzy logic variables such as "not engaged," "moderately engaged" and "highly engaged." The level of engagement may be a numerical value (e.g., three) on a pre-defined scale (e.g., scale ranging from zero to ten where zero corresponds to no engagement and ten corresponds to maximum engagement). As a matter of example, the media guidance application may access media consumption history data structure associated with user 110 (e.g., Teddy) and query for user 110's level of engagement in media asset 116 (e.g., "Frozen"). The media guidance application may determine, based on the results from the query, that level of engagement of user 110 in media asset 116 is seven.

The media guidance application may determine a level of engagement of a user in a content based on monitoring for indicators of engagement in content. Indicators of engagement in content can be but are not limited to a representation of actions performed on the content (e.g., volume changes, playback speed changes, channel switch and other suitable actions), user's activity during presentation of the content (e.g., user's social media activity, user's movements and gestures and other suitable activity) and user's physiological and emotional response (e.g., user's heart rate, facial expressions and other responses). The media guidance application may access a variety of monitoring devices (e.g., image and video capture devices, motion, physiological, and neurological sensors and other suitable monitoring devices) to monitor for the indicators of engagement. Various systems and methods for determining level of engagement of a user in content based on indicators of content is, discussed in, for example, U.S. patent application Ser. No. 15/198,495, filed Jun. 30, 2016, which is hereby incorporated by reference herein in its entirety.

The media guidance application may retrieve, from a threshold parameters data structure, a threshold level of engagement, where the threshold level of engagement is a minimum level of engagement required to be classified as engaged in a media asset. For example, the media guidance application may access the threshold parameters data structure and query, using an appropriate database language, for the threshold level of engagement. As a matter of example, level of engagement may be defined on a scale of one to ten in this case and the media guidance application may retrieve a value of six as the threshold level of engagement. The media guidance application may determine, based on comparing the level of engagement of the second user in the second media asset with the threshold level of engagement, whether the second user is engaged in the second media asset. The media guidance application may, in response to determining that the second user is engaged in the second media asset, present the second media asset on the first user equipment device from the second current playback position within the second media asset. For example, the media guidance application may execute a Boolean comparison function that returns a "true" result upon determining that the level of engagement of the second user in the second media asset exceeds the threshold level of engagement. The media guidance application may, because user 110's level of engagement in media asset 116 (e.g., seven) exceeds the threshold level of engagement (e.g., six), receive a "true" result from the Boolean comparison function. Accordingly, the media guidance application may, upon receiving the "true" result, present media asset 116 from playback position (00:10:00:00)—the playback position in media asset 116 at which user 110 had left location 112.

In some embodiments, the media guidance application may, upon determining that the second user is not interested in the second media asset, determine whether the second user is interested in the first media asset. The media guidance application may, upon determining that the second user is interested in the first media asset, continue presenting the first media asset even after the first user leaves the first location. The media guidance application may, upon determining that the second user is not interested in either the first media asset or the second media asset, present a third different media asset when the first user leaves the first location. Specifically, the media guidance application may, in response to determining that the second user is not engaged in the second media asset, retrieve, from the media consumption history data structure associated with the second user, a level of engagement of the second user in the first media asset. As a matter of example, the media guidance application may retrieve a value of three corresponding to user 110's level of engagement in media asset 116. In this case, the media guidance application may receive a "false" value upon executing the Boolean comparison function that returns a "true" result upon determining that the level of engagement of the second user in the second media asset exceeds the threshold level of engagement. Accordingly, the media guidance application may determine that user 110 is not engaged in media asset 116 and responsively, query the media consumption history data structure for user 110's level of engagement in media asset 114 (e.g., "Game of Thrones").

The media guidance application may determine, based on comparing the level of engagement of the second user in the first media asset with the threshold level of engagement, whether the second user is engaged in the first media asset. For example, the media guidance application may execute a Boolean comparison function that returns a "true" result upon determining that the level of engagement of the second user in the first media asset exceeds the threshold level of engagement. The media guidance application may, in response to determining that the second user is engaged in the first media asset, continue presentation of the first media asset on the first user equipment device. As a matter of example, the media guidance application may determine, based on the query results, that user 110's level of engagement in media asset 114 (e.g., "Game of Thrones") is eight. The media guidance application may, because user 110's level of engagement in media asset 114 (e.g., eight) exceeds the threshold level of engagement (e.g., six), receive a "true" result from the Boolean comparison function. Accordingly, the media guidance application may, upon receiving the "true" result, continue presenting media asset 114 on user equipment device 102 at location 106.

The media guidance application may, in response to determining that the second user is not engaged in the first media asset, present a third media asset on the first user equipment device. As a matter of example, the media guidance application may determine, based on the query results, that user 110's level of engagement in media asset 114 (e.g., "Game of Thrones") is two. The media guidance application may, because user 110's level of engagement in media asset 114 (e.g., two) is less than the threshold level of engagement (e.g., six), receive a "false" result from the Boolean comparison function. Accordingly, the media guidance application may, upon receiving the "false" result, present the movie "Up" instead on the user equipment device 102 (e.g., television) at location 106 (e.g., the living room). The media guidance application may access user 110's media consumption history and query for user 110's media asset preferences. The media guidance application may select the third movie based on user 110's media asset preferences.

In some embodiments, the media guidance application may determine, upon detecting that the first user has left the first location, that a current progress point in the first media asset is in between a start point and an end point of a given segment in the first media asset. The media guidance application may wait until the end point of the given segment is reached before presenting the second media asset. By waiting until the end point of the given segment is reached, the media guidance application ensures that the presentation of the first media asset is stopped at some logical point in the first media asset (e.g., end of a scene, end of a sub-plot arc and other suitable logical points). Specifically, the media guidance application may, when presenting the second media asset on the first user equipment device from the second current playback position within the second media asset, retrieve from a data structure associated with the first media asset, start times and end times of segments of the first media asset. For example, the media guidance application may access a media guidance data structure associated with media asset 114 (e.g., "Game of Thrones") and retrieve metadata for "media asset 114. The media guidance application may parse the metadata, using suitable metadata extraction tools, for start and end times of segments in media asset 114. As a matter of example, the media guidance application may determine, based on the metadata, that media asset 114 is made up of twenty segments (e.g., segments one through twenty, where number of a segment indicates the position of the segment in an ordered sequence of segments in media asset 114). Segment start and end times may time codes associated with a frame of the first media asset. For example, segment one may have a start time code of (00:00:00) and end time code of (00:02:59). For example, segment four may have a start time code of (00:18:00) and end time code of (00:23:59).

The media guidance application may determine, based on comparing the start times and the end times of the segments of the first media asset with the first current playback position, that the current playback position is in between a first start time and a first end time of a first segment of the first media asset. The media guidance application may refrain from presenting the second media asset until the first current playback position coincides with the first end time. As a matter of example, the media guidance application may determine that the time code associated with current playback position in media asset 114 at time 150, when user 104 (e.g., Mary) exits location 106 (e.g., living room) is (00:20:00). The media guidance application may execute a routine that receives the start time of a given segment, end time of the given segment and the first current playback position as input variables and returns a "true" result in the event that the first current playback position is in between the start time and the end time of the given segment. The media guidance application may repeatedly execute the routine until the media guidance application receives a "true" result or until the media guidance application has checked all segments in the first media asset. As an illustrative example, the media guidance application may determine, based on receiving a "true" result from the routine for segment four of media asset 114, that the current playback position (e.g., 00:20:00) is in between a start time (e.g., 00:18:00) and an end time (e.g., 00:23:59) of segment four of media asset 114. Accordingly, the media guidance application may wait until the current playback position in media asset 114 is (00:23:59) before presenting media asset 116 (e.g., "Frozen").

In some embodiments, when the first user left the first location, the media guidance application may, upon determining that the current progress point in the first media asset is in between a start point and an end point of a segment in the first media asset, determine whether any characteristic of the given segment matches media asset characteristics that the second user is interested in. The media guidance application may wait until the end point of the given segment is reached before presenting the second media asset only if the given segment is associated with a media asset characteristic that the second user is interested in. Specifically, the media guidance application may, when refraining from presenting the second media asset until the first current playback position coincides with the first end time, retrieve, from the data structure associated with the first media asset, a first media asset characteristic associated with the first segment of the first media asset. Following from the example above, where the current playback position in media asset 114 (e.g., "Game of Thrones") when user 104 (e.g., Mary) leaves location 106 (e.g., living room) is in between the start and end times of segment four, the media guidance application may retrieve, from the media guidance data structure associated with media asset 114, metadata associated with segment four. The media guidance application may extract, from the metadata for segment four, a media asset characteristic of segment four of media asset 114. Media asset characteristic may include, but is not limited to, a genre, an actor, a character, a plotline, a setting and an event. As an illustrative example, segment four of media asset 114 may be associated with the story-line of the character "John Snow" who is played by the actor "kit Harington." The media guidance application may select actor "kit Harington" as first media asset characteristic.

The media guidance application may retrieve, from a user profile data structure associated with the second user, preferred media asset characteristics of the second user. The media guidance application may determine, based on comparing the first media asset characteristic with the preferred media asset characteristics of the second user, that the first media asset characteristic is included in the preferred media asset characteristics of the second user. For example, the media guidance application may access may access user 110's user profile and query for user 110's preferred media asset characteristics. The media guidance application may receive a list of user 110's preferred media asset characteristics as a result of the query. The media guidance application may then execute a Boolean function that takes a certain media asset characteristic as an input and returns a "true" result if the list of user 110's preferred media asset characteristics includes the certain media asset characteristic. As a matter of example, the media guidance application may execute the Boolean function to determine whether the list of user 110's preferred media asset characteristics includes "Kit Harrington." In some embodiments, the media guidance application may repeatedly execute the Boolean function until it receives a "true" result or until the media guidance application has checked all media asset characteristics associated with the first segment. The media guidance application may, in response to determining that the first media asset characteristic is included in the preferred media asset characteristics of the second user, refrain from presenting the second media asset until the first current playback position coincides with the first end time. In this case, the media guidance application may receive, because the list of user 110's preferred media asset characteristics includes "Kit Harrington," a "true" result from the Boolean function. Accordingly, the media guidance application may determine that segment four of media asset 114 is associated with a media asset characteristic Teddy prefers and therefore, the media guidance application may wait until the current playback position in media asset 114 reaches (00:23:59) before presenting media asset 116.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (e.g., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
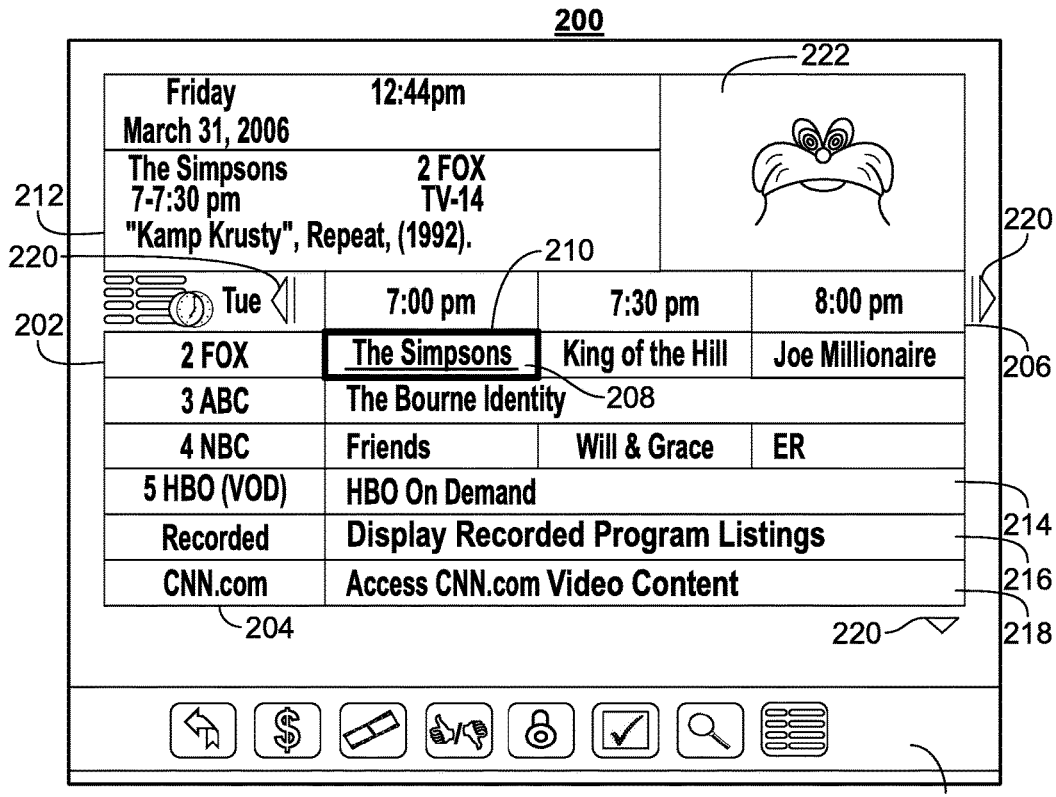
FIG. 2 shows an illustrative example of a display screen for use in accessing media content in accordance with some embodiments of the disclosure.
Figure 3:
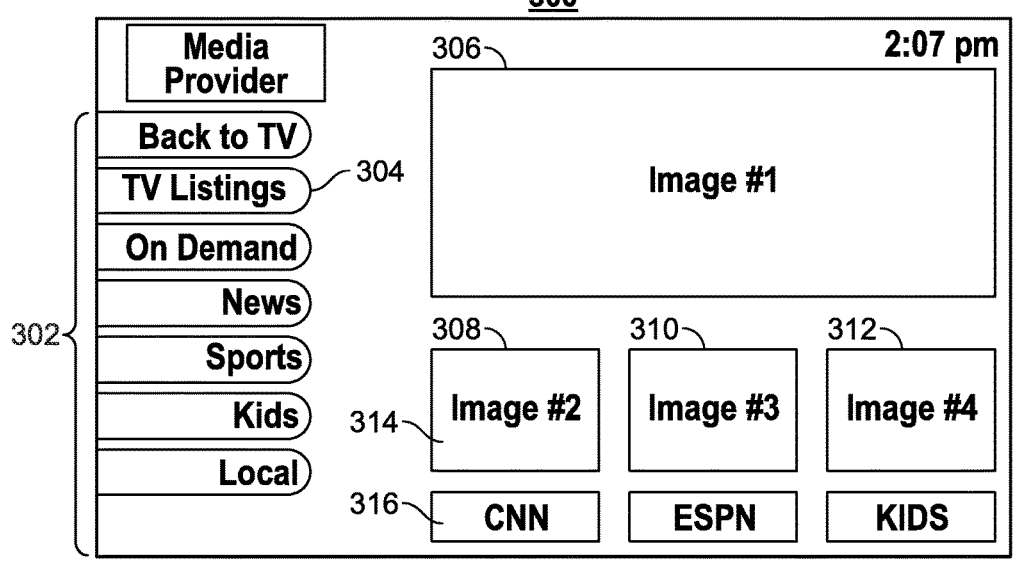
FIG. 3 shows another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, advertisement 224, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 224 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 202. Advertisement 224 may also be for products or services related or unrelated to the content displayed in grid 202. Advertisement 224 may be selectable and provide further information about content, provide information about a product or a service, enable purchasing of content, a product, or a service, provide content relating to the advertisement, etc. Advertisement 224 may be targeted based on a user's profile/preferences, monitored user activity, the type of display provided, or on other suitable targeted advertisement bases.

While advertisement 224 is shown as rectangular or banner shaped, advertisements may be provided in any suitable size, shape, and location in a guidance application display. For example, advertisement 224 may be provided as a rectangular shape that is horizontally adjacent to grid 202. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (e.g., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
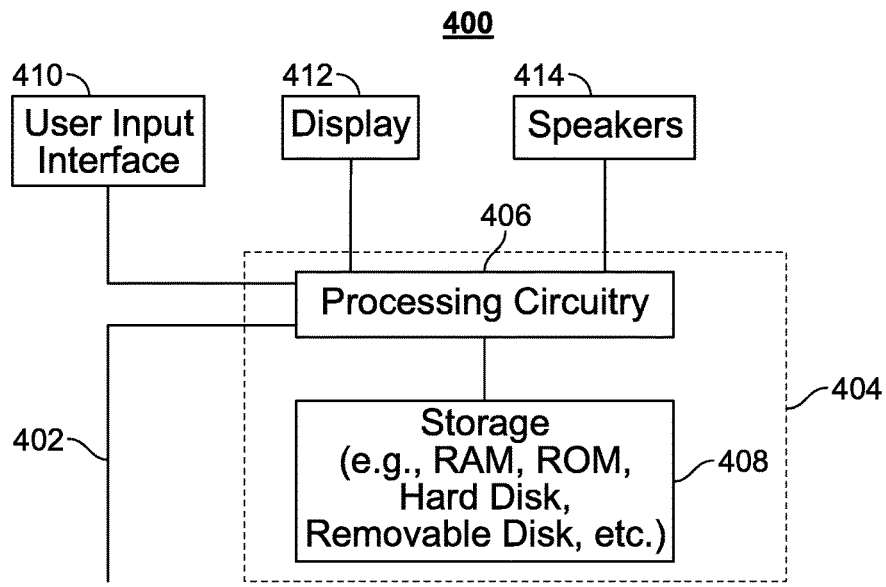
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (e.g., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
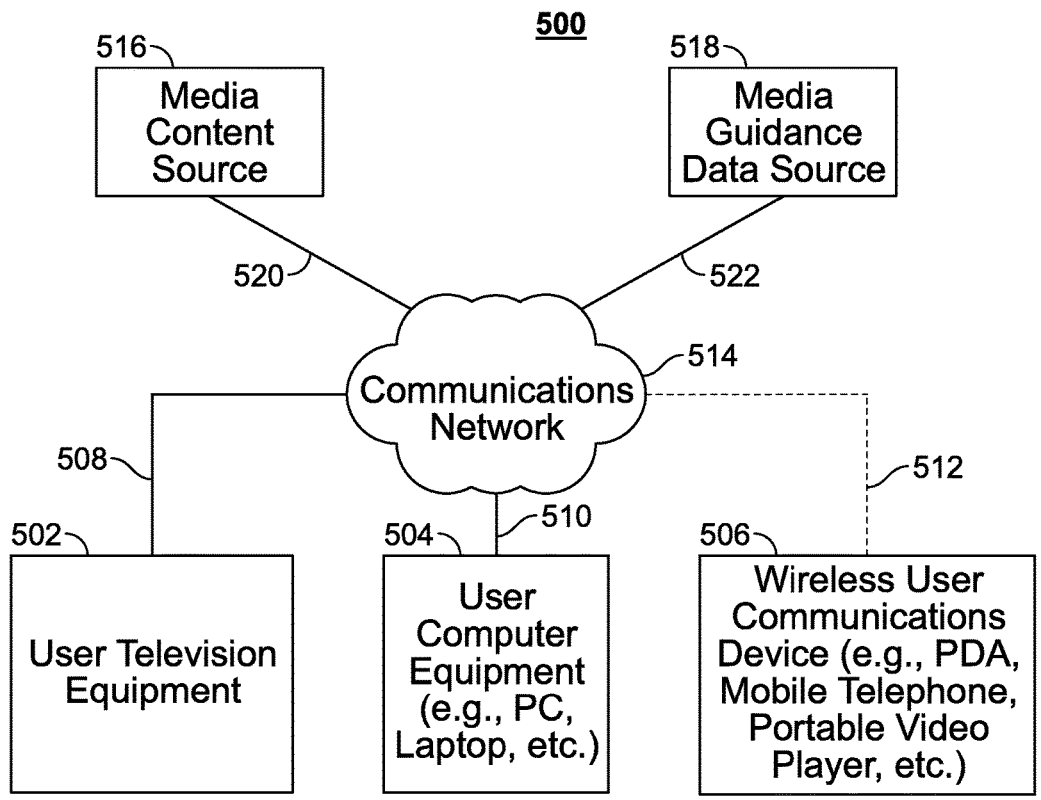
FIG. 5 is a block diagram of an illustrative media system in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some user television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition, or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, e.g., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
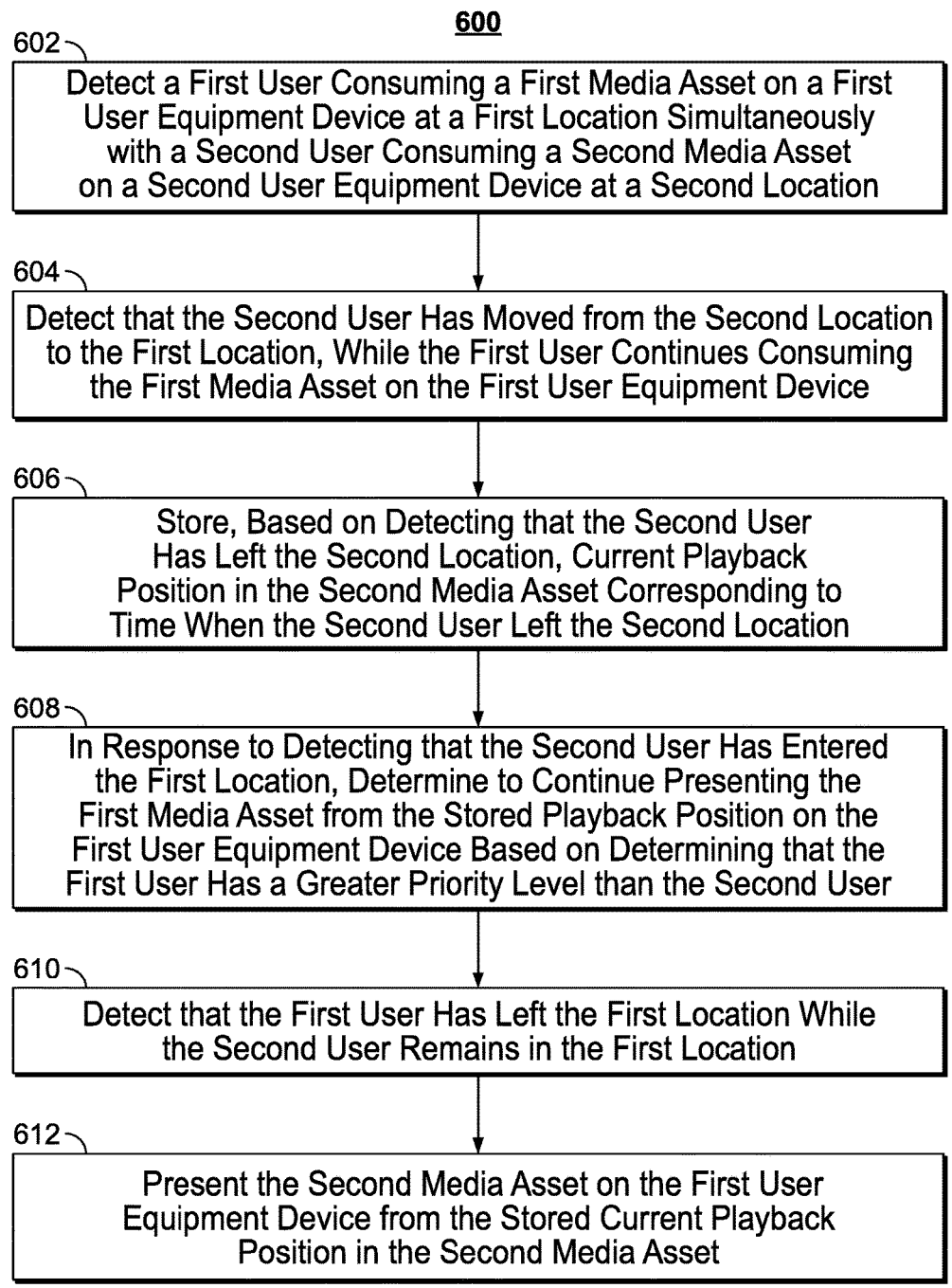
FIG. 6 is a flowchart of illustrative steps involved in automatically resuming appropriate paused content when there are multiple users at a media device, in accordance with some embodiments of the disclosure.

FIG. 6 is a flowchart of illustrative steps involved in automatically resuming appropriate paused content when there are multiple users at a media device, in accordance with some embodiments of the disclosure. Process 600 may be executed by control circuitry 404 (FIG. 4) as instructed by the media guidance application. Control circuitry 404 may be implemented on user equipment 502, 504, and/or 506 (FIG. 5). In addition, one or more steps of process 600 may be incorporated into or combined with one or more steps of any other process or embodiment.

Process 600 begins at 602, where control circuitry 404 detects a first user consuming a first media asset on a first user equipment device at a first location simultaneously with a second user consuming a second media asset on a second user equipment device at a second location. For example, control circuitry 404 may detect that user 104 (e.g., first user Mary) is watching media asset 114 (e.g., first media asset such as "Game of Thrones") on a user equipment device 102 (e.g., first user equipment device such as a television) at location 106 (e.g., first location such as a living room). Control circuitry 404 may also detect that that user 110 (e.g., second user Teddy) is simultaneously watching media asset 116 (e.g., second media asset such as "Frozen") on user equipment device 108 (e.g., second user equipment device such as a tablet device) at location 112 (e.g., second location such as play room).

Process 600 continues to 604, where control circuitry 404 detects that the second user has moved from the second location to the first location, while the first user continues consuming the first media asset on the first user equipment device. For example, control circuitry 404 may detect that user 110 (e.g., Teddy) has moved from location 112 (e.g., play room) to location 106 (e.g., the living room) while user 104 (e.g., Mary) is still watching media asset 114 (e.g., "Game of Thrones") at location 106. Process 600 continues to 606, where control circuitry 404 stores, based on detecting that the second user has left the second location, current playback position in the second media asset corresponding to time when the second user left the second location. For example, at the time when user 110 leaves the location 112, control circuitry 404 may store time code (00:10:00:00) as a current playback position in media asset 116.

Process 600 continues to 608, where control circuitry 404, in response to detecting that the second user has entered the first location, determines to continue presenting the first media asset from the stored playback position on the first user equipment device based on determining that the first user has a greater priority level than the second user. For example, upon determining that user 110 (e.g., Teddy) has entered the living room, the control circuitry 404 may retrieve priority levels associated with user 110 and user 104 (e.g., Mary). As a matter of example, the priority level may be defined on a numerical scale of zero to ten and the control circuitry 404 may retrieve a priority level of seven for user 104 (e.g., Mary) and priority level of five for user 110 (e.g., Teddy). Accordingly, control circuitry 404 may continue presenting media asset 114 (e.g., "Game of Thrones") on the user equipment device 102 (e.g., television) at location 106 (e.g., living room) when user 110 joins user 104 at location 106.

Process 600 continues to 610, where control circuitry 404 detects that the first user has left the first location while the second user remains in the first location. Process 600 continues to 612, where control circuitry 404 presents the second media asset on the first user equipment device from the stored current playback position in the second media asset. For example, control circuitry 404 may detect that user 104 (e.g., Mary) has left location 106 (e.g., the living room) while user 110 (e.g., Teddy) remains at location 106. Accordingly, control circuitry 404 may automatically present, without receiving any user input from user 110, media asset 116 (e.g., "Frozen") from playback position (00:10:00:00)—the playback position in media asset 116 at which user 110 had left location 112 (e.g., play room).

Figure 7:
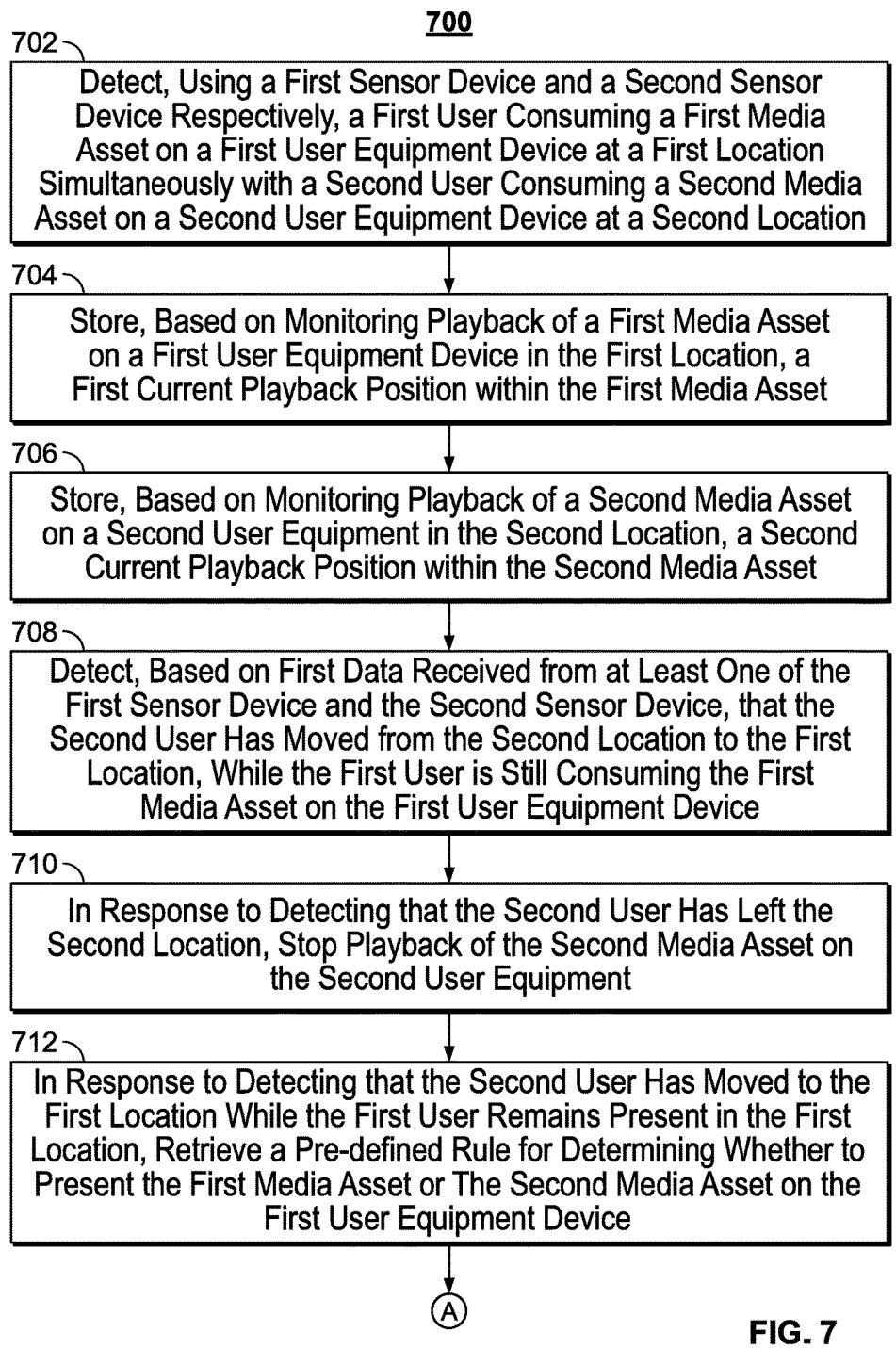
FIG. 7 is another flowchart of illustrative steps involved in automatically resuming appropriate paused content when there are multiple users at a media device, in accordance with some embodiments of the disclosure.
Figure 7:
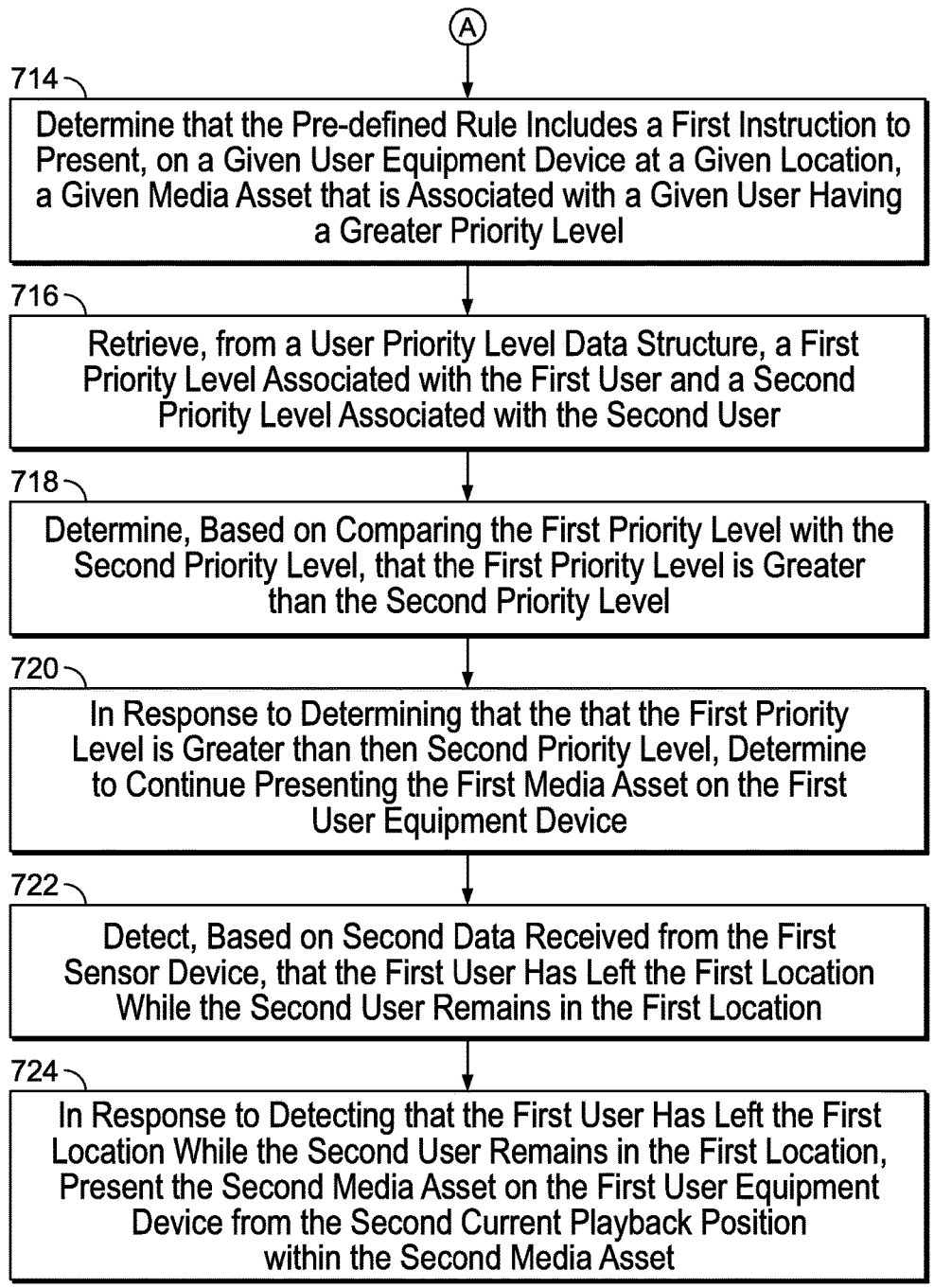

FIG. 7 is another flowchart of illustrative steps involved in automatically resuming appropriate paused content when there are multiple users at a media device, in accordance with some embodiments of the disclosure. Process 700 may be executed by control circuitry 404 (FIG. 4) as instructed by the media guidance application. Control circuitry 404 may be implemented on user equipment 502, 504, and/or 506 (FIG. 5). In addition, one or more steps of process 700 may be incorporated into or combined with one or more steps of any other process or embodiment.

Process 700 begins at 702, where control circuitry 404 detects, using a first sensor device and a second sensor device respectively, a first user consuming a first media asset on a first user equipment device at a first location simultaneously with a second user consuming a second media asset on a second user equipment device at a second location. As a matter of example, the first sensor device and the second sensor device may be cameras. Control circuitry 404 may determine, based on images captured by cameras at location 106 and location 112 in manners discussed previously, that, at time 100, user 104 (e.g., Mary) is watching media asset 114 (e.g., "Game of Thrones") on user equipment device 102 (e.g., a television) at location 106 (e.g., the living room) while user 110 (e.g., Teddy) is watching media asset 116 (e.g., "Frozen") on user equipment device 108 (e.g., a tablet device) at location 112 (e.g., the play room). Process 700 continues to 704, where control circuitry 404 stores, based on monitoring playback of a first media asset on a first user equipment device in the first location, a first current playback position within the first media asset. As an illustrative example, at a given point in time, the current progress point in media asset 114 may be time code (00:15:00:00) and control circuitry 404 may store the time code (00:15:00:00) in the current playback position data structure associated with media asset 114. Process 700 continues to 706, where control circuitry 404 stores, based on monitoring playback of a second media asset on a second user equipment in the second location, a second current playback position within the second media asset. For example, at a given point in time, the current progress point in media asset 116 (e.g., "Frozen") may be time code (00:8:00:00) and control circuitry 404 may store the time code (00:8:00:00) in the current playback position data structure associated with media asset 116.

Process 700 continues to 708, where control circuitry 404 detects, based on first data received from at least one of the first sensor device and the second sensor device, that the second user has moved from the second location to the first location, while the first user is still consuming the first media asset on the first user equipment device. Following from the example where the first and second sensor devices are cameras, control circuitry 404 may detect that current images captured by the camera at location 112 (e.g., play room) no longer includes images of user 110 (e.g., Teddy). Control circuitry 404 may also detect that current images captured by the camera at location 106 (e.g., the living room) now include images of both user 104 and user 110. Accordingly, control circuitry 404 may determine that user 110 has moved out of location 112 and joined user 104 at location 106 (e.g., living room). Control circuitry 404 may determine, based on accessing a device status data structure associated with the user equipment device 102 at location 106, that media asset 114 (e.g., "Game of Thrones") was still being presented on user equipment device 102 (e.g., television) when user 110 joined user 104 at location 106. Accordingly, control circuitry 404 may determine that user 110 has moved from location 112 to location 106, while user 104 is still consuming media asset 114 on user equipment device 102 at location 106.

Process 700 continues to 710, where control circuitry 404, in response to detecting that the second user has left the second location, stops playback of the second media asset on the second user equipment. For example, control circuitry 404 may, upon detecting that images captured by the camera in the play room no longer include images of user 110 (e.g., Teddy), stop playback of media asset 116 (e.g., "Frozen") on user equipment device 108 (e.g., the tablet). As an illustrative example, at the point in time when user 110 leaves location 112, the current progress point in media asset 116 may be time code (00:10:00:00). Accordingly, control circuitry 404 may store the time code (00:10:00:00) in the current playback position data structure associated with media asset 116. Process 700 continues to 712, where control circuitry 404, in response to detecting that the second user has moved to the first location while the first user remains present in the first location, retrieves a pre-defined rule for determining whether to present the first media asset or the second media asset on the first user equipment device. For example, control circuitry 404 may, upon detecting that current images captured by the camera at location 106 (e.g., living room) now include images of both user 104 and user 110, access a "Rules for presenting appropriate content in multi-user scenario" data structure, located at any of storage 408, media content source 516 and media guidance data source 518, and query for an appropriate rule for determining which content to present.

Process 700 continues to 714, where control circuitry 404 determines that the pre-defined rule includes a first instruction to present, on a given user equipment device at a given location, a given media asset that is associated with a given user having a greater priority level. As an illustrative example, control circuitry 404 may determine that the value of the instruction field of the retrieved particular rule entry is a conditional statement such as "If priority of user A is greater than priority of user B, present media asset associated with user A; else present media asset associated with user A." Process 700 continues to 716, where control circuitry 404 retrieves, from a user priority level data structure, a first priority level associated with the first user and a second priority level associated with the second user. For example, control circuitry 404 may access the user priority level data structure, located at any of storage 408, media content source 516 and media guidance data source 518, and query for priority levels associated with user 104 and user 110.

Process 700 continues to 718, where control circuitry 404 determines, based on comparing the first priority level with the second priority level, that the first priority level is greater than the second priority level. Process 700 continues to 720, where control circuitry 404, in response to determining that the that the first priority level is greater than then second priority level, determines to continue presenting the first media asset on the first user equipment device. For example, control circuitry 404 may use a Boolean comparator function and determine that priority level for user 104 (e.g., seven) is greater than priority level for user 110 (e.g., five). Control circuitry 404 may, because user 104's priority level is greater than user 110's priority level, continue presenting media asset 114 (e.g., "Game of Thrones") on user equipment device 102 (e.g., television) at location 106 (e.g., living room) when user 110 joins user 104 at location 106.

Process 700 continues to 722, where control circuitry 404 detects, based on second data received from the first sensor device, that the first user has left the first location while the second user remains in the first location. For example, at time 150, control circuitry 404 may detect that current images captured by the camera at location 106 (e.g., living room) include images of user 110 only. Accordingly, control circuitry 404 may determine that user 104 has left location 106 while user 110 remains at location 106. Process 700 continues to 724, where control circuitry 404, in response to detecting that the first user has left the first location while the second user remains in the first location, presents the second media asset on the first user equipment device from the second current playback position within the second media asset. For example, control circuitry 404 may retrieve the time code (e.g., (00:10:00:00)) stored in the current playback position data structure associated with media asset 116 (e.g., "Frozen"). Control circuitry 404 may automatically present, without receiving any user input from user 110, media asset 116 from playback position (00:10:00:00)—the playback position in media asset 116 at which user 110 had left location 112.

Figure 8:
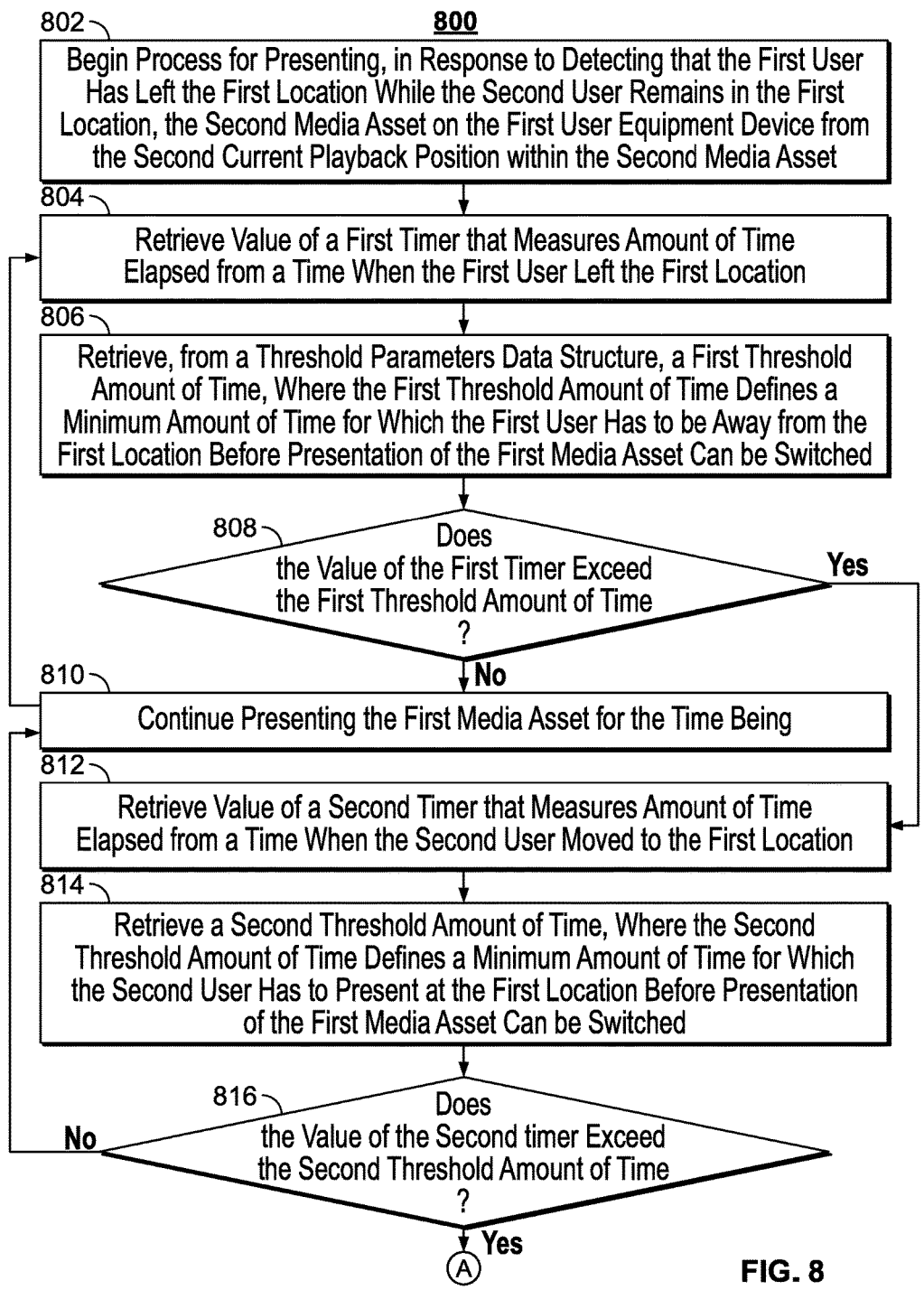
FIG. 8 is another flowchart of illustrative steps involved in presenting, in response to detecting that the first user has left the first location while the second user remains in the first location, the second media asset on the first user equipment device from the second current playback position within the second media asset, in accordance with some embodiments of the disclosure.
Figure 8:
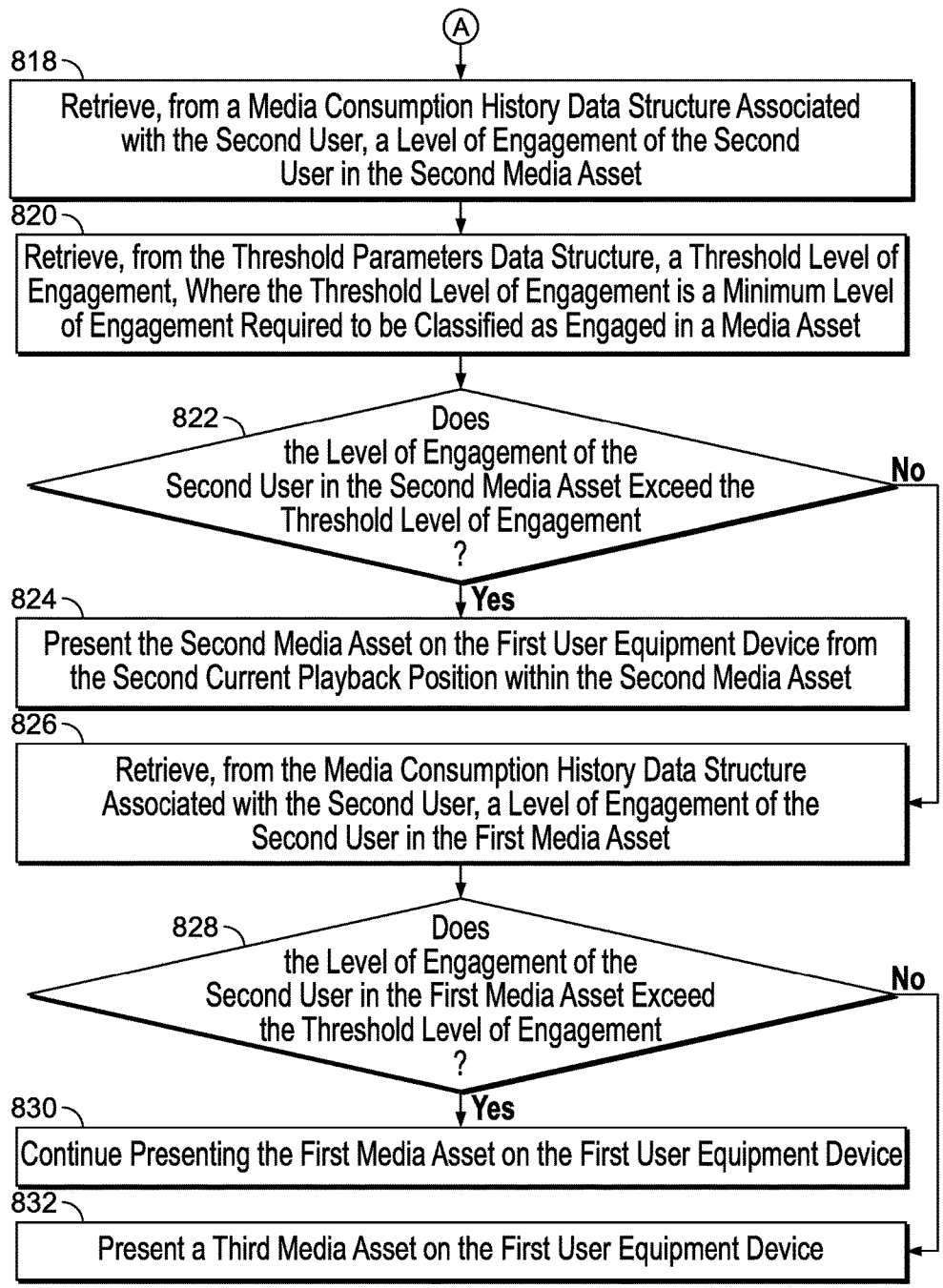

FIG. 8 is another flowchart of illustrative steps involved in presenting, in response to detecting that the first user has left the first location while the second user remains in the first location, the second media asset on the first user equipment device from the second current playback position within the second media asset, in accordance with some embodiments of the disclosure. Process 800 may be executed by control circuitry 404 (FIG. 4) as instructed by the media guidance application. Control circuitry 404 may be implemented on user equipment 502, 504, and/or 506 (FIG. 5). In addition, one or more steps of process 800 may be incorporated into or combined with one or more steps of any other process or embodiment. Process 800 begins at 802, where control circuitry 404 begins process for presenting, in response to detecting that the first user has left the first location while the second user remains in the first location, the second media asset on the first user equipment device from the second current playback position within the second media asset. Process 800 continues to 804, where control circuitry 404 retrieves value of a first timer that measures amount of time elapsed from a time when the first user left the first location. For example, control circuitry 404 may, upon detecting, in manners discussed previously, that user 104 (e.g., Mary) has left location 106 (e.g., living room), start a timer, initialized at zero, for measuring amount of time for which user 104 is away from location 106. At any given time, control circuitry 404 may query for the value of the timer to determine amount of time for which user 104 is away from location 106.

Process 800 continues to 806, where control circuitry 404 retrieves, from a threshold parameters data structure, a first threshold amount of time, where the first threshold amount of time defines a minimum amount of time for which the first user has to be away from the first location before presentation of the first media asset can be switched. Control circuitry 404 may retrieve, from a threshold parameters data structure, located at any of storage 408, media content source 516 and media guidance data source 518, a first threshold amount of time, where the first threshold amount of time defines a minimum amount of time for which the first user has to be away from the first location before presentation of the first media asset can be switched. For example, control circuitry 404 may access the threshold parameters data structure and query, using an appropriate database language, for the first threshold amount of time. For example, control circuitry 404 may retrieve a value of two minutes as the first threshold amount of time. Process 800 continues to 808, where control circuitry 404 determines whether the value of the first timer exceeds the first threshold amount of time. For example, control circuitry 404 may execute a Boolean comparison function that returns a "true" result upon determining that the value of the first timer exceeds the threshold amount of time.

If, at 808, control circuitry 404 determines that the value of the first timer does not exceed the first threshold amount of time, process 800 continues to 810. For example, user 104 may have returned to location 106 within two minutes. Accordingly, control circuitry 404 may receive a "false" result from the Boolean comparison function and proceed to 810. At 810, control circuitry 404 continues presenting the first media asset for the time being. Process 800 then reverts to 804. If, at 808, control circuitry 404 determines that the value of the first timer exceeds the first threshold amount of time, process 800 continues to 812. For example, user 104 (e.g., Mary) may be away from location 106 (e.g., living room) for longer than two minutes and control circuitry 404 may receive a "true" result from the Boolean comparison function when the value of the timer reaches two minutes and one second.

At 812, control circuitry 404 retrieves value of a second timer that measures amount of time elapsed from a time when the second user moved to the first location. For example, control circuitry 404 may, upon detecting, in manners discussed previously, that user 110 (e.g., Teddy) has joined user 104 (e.g., Mary) at location 106 (e.g., living room), start a timer, initialized at zero, for measuring amount of time for which user 110 is at location 106. At any given time, control circuitry 404 may query for the value of the second timer to determine amount of time for which user 110 has been at location 106. Process 800 continues to 814, where control circuitry 404 retrieves a second threshold amount of time, where the second threshold amount of time defines a minimum amount of time for which the second user has to be present at the first location before presentation of the first media asset can be switched. For example, control circuitry 404 may access the threshold parameters data structure, located at any of storage 408, media content source 516 and media guidance data source 518, and query, using an appropriate database language, for the second threshold amount of time. For example, control circuitry 404 may retrieve a value of five minutes as the second threshold amount of time. Process 800 continues to 816, where control circuitry 404 determines whether the value of the second timer exceeds the second threshold amount of time. For example, control circuitry 404 may execute a Boolean comparison function that returns a "true" result upon determining that the value of the second timer exceeds the threshold amount of time.

If, at 816, control circuitry 404 determines that the value of the second timer does not exceed the second threshold amount of time, control circuitry 404 continues to 810. For example, user 110 (e.g., Teddy) may have been at location 106 (e.g., living room) for three minutes when user 104 left location 106. Accordingly, control circuitry 404 may receive a "false" result from the Boolean comparison function and responsively, continue to 810. If, at 816, control circuitry 404 determines that the value of the second timer exceeds the second threshold amount of time, control circuitry 404 continues to 818. For example, user 110 (e.g., Teddy) may have been at location 106 (e.g., living room) for seven minutes when user 104 left location 106. Accordingly, control circuitry 404 may receive a "true" result from the Boolean comparison function and responsively, continue to 818. At 818, control circuitry 404 retrieves, from a media consumption history data structure associated with the second user, a level of engagement of the second user in the second media asset. As a matter of example, control circuitry 404 may access media consumption history data structure associated with user 110 (e.g., Teddy) and query for user 110's level of engagement in media asset 116 (e.g., "Frozen"). Control circuitry 404 may determine, based on the results from the query, that level of engagement of user 110 in media asset 116 is seven.

Process 800 continues to 820, where control circuitry 404 retrieves, from the threshold parameters data structure, a threshold level of engagement, where the threshold level of engagement is a minimum level of engagement required to be classified as engaged in a media asset. For example, control circuitry 404 may access the threshold parameters data structure and query, using an appropriate database language, for the threshold level of engagement. As a matter of example, level of engagement may be defined on a scale of one to ten in this case and control circuitry 404 may retrieve a value of six as the threshold level of engagement. Process 800 continues to 822, where control circuitry 404 determines whether the level of engagement of the second user in the second media asset exceed the threshold level of engagement. For example, control circuitry 404 may execute a Boolean comparison function that returns a "true" result upon determining that the level of engagement of the second user in the second media asset exceeds the threshold level of engagement.

If, at 822, control circuitry 404 determines that the level of engagement of the second user in the second media asset exceeds the threshold level of engagement, process 800 continues to 824. At 824, control circuitry 404 presents the second media asset on the first user equipment device from the second current playback position within the second media asset. Following from the example where level of engagement of user 110 in media asset 116 is seven, control circuitry 404 may, because user 110's level of engagement in media asset 116 (e.g., seven) exceeds the threshold level of engagement (e.g., six), receive a "true" result from the Boolean comparison function. Accordingly, control circuitry 404 may, upon receiving the "true" result, present media asset 116 from playback position (00:10:00:00)—the playback position in media asset 116 at which user 110 had left location 112.

If, at 822, control circuitry 404 determines that the level of engagement of the second user in the second media asset does not exceed the threshold level of engagement, process 800 continues to 826. At 826, control circuitry 404 retrieves, from the media consumption history data structure associated with the second user, a level of engagement of the second user in the first media asset. As a matter of example, control circuitry 404 may retrieve a value of three corresponding to user 110's level of engagement in media asset 116. In this case, control circuitry 404 may receive a "false" value upon executing the Boolean comparison function that returns a "true" result upon determining that the level of engagement of the second user in the second media asset exceeds the threshold level of engagement. Accordingly, control circuitry 404 may determine that user 110 is not engaged in media asset 116 and responsively, query the media consumption history data structure for user 110's level of engagement in media asset 114 (e.g., "Game of Thrones").

Process 800 continues to 828, where control circuitry 404 determines whether the level of engagement of the second user in the first media asset exceeds the threshold level of engagement. For example, control circuitry 404 may execute a Boolean comparison function that returns a "true" result upon determining that the level of engagement of the second user in the first media asset exceeds the threshold level of engagement. If, at 828, control circuitry 404 determines that the level of engagement of the second user in the first media asset exceeds the threshold level of engagement, process 800 continues to 830. At 830, control circuitry 404 continues presenting the first media asset on the first user equipment device. As a matter of example, control circuitry 404 may determine, based on the query results, that user 110's level of engagement in media asset 114 (e.g., "Game of Thrones") is eight. Control circuitry 404 may, because user 110's level of engagement in media asset 114 (e.g., eight) exceeds the threshold level of engagement (e.g., six), receive a "true" result from the Boolean comparison function. Accordingly, control circuitry 404 may, upon receiving the "true" result, continue presenting media asset 114 on user equipment device 102 at location 106.

If, at 828, control circuitry 404 determines that the level of engagement of the second user in the first media asset does not exceed the threshold level of engagement, process 800 continues to 832. At 832, control circuitry 404 presents a third media asset on the first user equipment device. As a matter of example, control circuitry 404 may determine, based on the query results, that user 110's level of engagement in media asset 114 (e.g., "Game of Thrones") is two. Control circuitry 404 may, because user 110's level of engagement in media asset 114 (e.g., two) is less than the threshold level of engagement (e.g., six), receive a "false" result from the Boolean comparison function. Accordingly, control circuitry 404 may, upon receiving the "false" result, present the movie "Up" instead on the user equipment device 102 (e.g., television) at location 106 (e.g., the living room). Control circuitry 404 may access user 110's media consumption history and query for user 110's media asset preferences. Control circuitry 404 may select the third movie based on user 110's media asset preferences.

It is contemplated that the steps or descriptions of FIGS. 6-8 may be used with any other embodiment of this disclosure. In addition, the steps and descriptions described in relation to FIG. 6-8 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for resuming appropriate paused content when there are multiple users at a media device, the method comprising:
   detecting, using a first sensor device and a second sensor device respectively, a first user consuming a first media asset on a first user equipment device at a first location simultaneously with a second user consuming a second media asset on a second user equipment device at a second location;
   storing, based on monitoring playback of a first media asset on a first user equipment device in the first location, a first current playback position within the first media asset;
   storing, based on monitoring playback of a second media asset on a second user equipment in the second location, a second current playback position within the second media asset;
   detecting, based on first data received from at least one of the first sensor device and the second sensor device, that the second user has moved from the second location to the first location, while the first user is still consuming the first media asset on the first user equipment device;
   in response to detecting that the second user has left the second location, stopping playback of the second media asset on the second user equipment;
   in response to detecting that the second user has moved to the first location while the first user remains present in the first location, retrieving a pre-defined rule for determining whether to present the first media asset or the second media asset on the first user equipment device;
   determining that the pre-defined rule includes a first instruction to present, on a given user equipment device at a given location, a given media asset that is associated with a given user having a greater priority level;
   retrieving, from a user priority level data structure, a first priority level associated with the first user and a second priority level associated with the second user;
   determining, based on comparing the first priority level with the second priority level, that the first priority level is greater than the second priority level;
   in response to determining that the that the first priority level is greater than then second priority level, determining to continue presenting the first media asset on the first user equipment device;
   detecting, based on second data received from the first sensor device, that the first user has left the first location while the second user remains in the first location; and
   in response to detecting that the first user has left the first location while the second user remains in the first location, presenting the second media asset on the first user equipment device from the second current playback position within the second media asset, wherein presenting the second media asset on the first user equipment device from the second current playback position within the second media asset further comprises:
   retrieving, from a media consumption history data structure associated with the second user, a level of engagement of the second user in the second media asset;
   retrieving, from a threshold parameters data structure, a threshold level of engagement, wherein the threshold level of engagement is a minimum level of engagement required to be classified as engaged in a media asset;
   determining, based on comparing the level of engagement of the second user in the second media asset with the threshold level of engagement, whether the second user is engaged in the second media asset;
   in response to determining that the second user is engaged in the second media asset, presenting the second media asset on the first user equipment device from the second current playback position within the second media asset;

in response to determining that the second user is not engaged in the second media asset, retrieving, from the media consumption history data structure associated with the second user, a level of engagement of the second user in the first media asset;
determining, based on comparing the level of engagement of the second user in the first media asset with the threshold level of engagement, whether the second user is engaged in the first media asset;
in response to determining that the second user is engaged in the first media asset, continuing presentation of the first media asset on the first user equipment device; and
in response to determining that the second user is not engaged in the first media asset, presenting a third media asset on the first user equipment device.

2. The method of claim 1, wherein determining to continue presenting the first media asset on the first user equipment device further comprises:
determining that the pre-defined rule includes a second instruction to present, on the given user equipment device at the given location, a media asset with content rating that matches parental controls settings associated with each user at the given location;
retrieving, from a data structure associated with the first media asset, content rating associated with the first media asset;
retrieving, from a user profile data structure associated with the second user, parental controls settings for the second user;
determining, based on comparing content rating associated with the first media asset with the parental controls settings for the second user, that the content rating associated with the first media asset matches the parental controls settings for the second user; and
in response to determining that the content rating associated with the first media asset matches the parental controls settings for the second user, determining to continue presenting the first media asset on the first user equipment.

3. The method of claim 1, wherein the first priority level and the second priority level are specific to the first location and wherein a third priority level associated with the first user at the second location and a fourth priority level associated with the second user at the second location may be different from the first priority level and the second priority level respectively.

4. The method of claim 1, wherein presenting the second media asset on the first user equipment device from the second current playback position within the second media asset further comprises:
in response to detecting that the first user has left the first location, starting a first timer that measures amount of time elapsed from a time when the first user left the first location;
retrieving, from a threshold parameters data structure, a first threshold amount of time, wherein the first threshold amount of time defines a minimum amount of time for which the first user has to be away from the first location before presentation of the first media asset can be switched;
determining, based on comparing value of the first timer with the first threshold amount of time, that the value of the first timer exceeds the threshold amount of time; and
in response to determining that the value of the first timer exceeds the first threshold amount of time, presenting the second media asset on the first user equipment device from the second current playback position within the second media asset.

5. The method of claim 1, wherein presenting the second media asset on the first user equipment device from the second current playback position within the second media asset further comprises:
in response to detecting that the second user has moved to the first location while the first user remains present in the first location, starting a second timer that measures amount of time elapsed from a time when the second user moved to the first location;
retrieving, from a threshold parameters data structure, a second threshold amount of time, wherein the second threshold amount of time defines a minimum amount of time for which the second user has to present at the first location before presentation of the first media asset can be switched;
in response to detecting that the first user has left the first location, comparing value of the second timer with the second threshold amount of time; and
in response to determining, based on comparing the value of the second timer with the second threshold amount of time, that the value of the second timer exceeds the second threshold amount of time, presenting the second media asset on the first user equipment device from the second current playback position within the second media asset.

6. The method of claim 1, wherein presenting the second media asset on the first user equipment device from the second current playback position within the second media asset further comprises:
retrieving from a data structure associated with the first media asset, start times and end times of segments of the first media asset;
determining, based on comparing the start times and the end times of the segments of the first media asset with the first current playback position, that the current playback position is in between a first start time and a first end time of a first segment of the first media asset; and
refraining from presenting the second media asset until the first current playback position coincides with the first end time.

7. The method of claim 6, wherein refraining from presenting the second media asset until the first current playback position coincides with the first end time further comprises:
retrieving, from the data structure associated with the first media asset, a first media asset characteristic associated with the first segment of the first media asset;
retrieving, from a user profile data structure associated with the second user, preferred media asset characteristics of the second user;
determining, based on comparing the first media asset characteristic with the preferred media asset characteristics of the second user, that the first media asset characteristic is included in the preferred media asset characteristics of the second user; and
in response to determining that the first media asset characteristic is included in the preferred media asset characteristics of the second user, refraining from presenting the second media asset until the first current playback position coincides with the first end time.

8. A system for resuming appropriate paused content when there are multiple users at a media device, the system comprising:

control circuitry configured to:
  detect, using a first sensor device and a second sensor device respectively, a first user consuming a first media asset on a first user equipment device at a first location simultaneously with a second user consuming a second media asset on a second user equipment device at a second location;
  store, based on monitoring playback of a first media asset on a first user equipment device in the first location, a first current playback position within the first media asset;
  store, based on monitoring playback of a second media asset on a second user equipment in the second location, a second current playback position within the second media asset;
  detect, based on first data received from at least one of the first sensor device and the second sensor device, that the second user has moved from the second location to the first location, while the first user is still consuming the first media asset on the first user equipment device;
  in response to detecting that the second user has left the second location, stop playback of the second media asset on the second user equipment;
  in response to detecting that the second user has moved to the first location while the first user remains present in the first location, retrieve a pre-defined rule for determining whether to present the first media asset or the second media asset on the first user equipment device;
  determine that the pre-defined rule includes a first instruction to present, on a given user equipment device at a given location, a given media asset that is associated with a given user having a greater priority level;
  retrieve, from a user priority level data structure, a first priority level associated with the first user and a second priority level associated with the second user;
  determine, based on comparing the first priority level with the second priority level, that the first priority level is greater than the second priority level; and
  in response to determining that the that the first priority level is greater than then second priority level, determine to continue presenting the first media asset on the first user equipment device;
  detect, based on second data received from the first sensor device, that the first user has left the first location while the second user remains in the first location; and
  in response to detecting that the first user has left the first location while the second user remains in the first location, present the second media asset on the first user equipment device from the second current playback position within the second media asset, wherein the control circuitry is further configured, when presenting the second media asset on the first user equipment device from the second current playback position within the second media asset, to:
  retrieve, from a media consumption history data structure associated with the second user, a level of engagement of the second user in the second media asset;
  retrieve, from a threshold parameters data structure, a threshold level of engagement, wherein the threshold level of engagement is a minimum level of engagement required to be classified as engaged in a media asset;
  determine, based on comparing the level of engagement of the second user in the second media asset with the threshold level of engagement, whether the second user is engaged in the second media asset;
  in response to determining that the second user is engaged in the second media asset, present the second media asset on the first user equipment device from the second current playback position within the second media asset;
  in response to determining that the second user is not engaged in the second media asset, retrieve, from the media consumption history data structure associated with the second user, a level of engagement of the second user in the first media asset;
  determine, based on comparing the level of engagement of the second user in the first media asset with the threshold level of engagement, whether the second user is engaged in the first media asset;
  in response to determining that the second user is engaged in the first media asset, continue presentation of the first media asset on the first user equipment device; and
  in response to determining that the second user is not engaged in the first media asset, present a third media asset on the first user equipment device.

9. The system of claim 8, wherein the control circuitry is further configured, when determining to continue presenting the first media asset on the first user equipment device, to:
  determine that the pre-defined rule includes a second instruction to present, on the given user equipment device at the given location, a media asset with content rating that matches parental controls settings associated with each user at the given location;
  retrieve, from a data structure associated with the first media asset, content rating associated with the first media asset;
  retrieve, from a user profile data structure associated with the second user, parental controls settings for the second user;
  determine, based on comparing content rating associated with the first media asset with the parental controls settings for the second user, that the content rating associated with the first media asset matches the parental controls settings for the second user; and
  in response to determining that the content rating associated with the first media asset matches the parental controls settings for the second user, determine to continue presenting the first media asset on the first user equipment.

10. The system of claim 8, wherein the first priority level and the second priority level are specific to the first location and wherein a third priority level associated with the first user at the second location and a fourth priority level associated with the second user at the second location may be different from the first priority level and the second priority level respectively.

11. The system of claim 8, wherein the control circuitry is further configured, when presenting the second media asset on the first user equipment device from the second current playback position within the second media asset, to:
  in response to detecting that the first user has left the first location, start a first timer that measures amount of time elapsed from a time when the first user left the first location;
  retrieve, from a threshold parameters data structure, a first threshold amount of time, wherein the first threshold amount of time defines a minimum amount of time for which the first user has to be away from the first location before presentation of the first media asset can be switched;

determine, based on comparing value of the first timer with the first threshold amount of time, that the value of the first timer exceeds the threshold amount of time; and in response to determining that the value of the first timer exceeds the first threshold amount of time, present the second media asset on the first user equipment device from the second current playback position within the second media asset.

12. The system of claim 8, wherein the control circuitry is further configured, when presenting the second media asset on the first user equipment device from the second current playback position within the second media asset, to:

in response to detecting that the second user has moved to the first location while the first user remains present in the first location, start a second timer that measures amount of time elapsed from a time when the second user moved to the first location;

retrieve, from a threshold parameters data structure, a second threshold amount of time, wherein the second threshold amount of time defines a minimum amount of time for which the second user has to present at the first location before presentation of the first media asset can be switched;

in response to detecting that the first user has left the first location, compare value of the second timer with the second threshold amount of time; and in response to determining, based on comparing the value of the second timer with the second threshold amount of time, that the value of the second timer exceeds the second threshold amount of time, present the second media asset on the first user equipment device from the second current playback position within the second media asset.

13. The system of claim 8, wherein the control circuitry is further configured, when presenting the second media asset on the first user equipment device from the second current playback position within the second media asset, to:

retrieve from a data structure associated with the first media asset, start times and end times of segments of the first media asset;

determine, based on comparing the start times and the end times of the segments of the first media asset with the first current playback position, that the current playback position is in between a first start time and a first end time of a first segment of the first media asset; and refrain from presenting the second media asset until the first current playback position coincides with the first end time.

14. The system of claim 13, wherein the control circuitry is further configured, when refraining from presenting the second media asset until the first current playback position coincides with the first end time, to:

retrieve, from the data structure associated with the first media asset, a first media asset characteristic associated with the first segment of the first media asset;

retrieve, from a user profile data structure associated with the second user, preferred media asset characteristics of the second user;

determine, based on comparing the first media asset characteristic with the preferred media asset characteristics of the second user, that the first media asset characteristic is included in the preferred media asset characteristics of the second user; and in response to determining that the first media asset characteristic is included in the preferred media asset characteristics of the second user, refrain from presenting the second media asset until the first current playback position coincides with the first end time.

\* \* \* \* \*